(12) United States Patent
Onuma et al.

(10) Patent No.: US 11,097,637 B2
(45) Date of Patent: Aug. 24, 2021

(54) VEHICLE SEAT HAVING INTERNAL SUPPORT MEMBER

(71) Applicants: TS TECH CO., LTD., Asaka (JP); HONDA MOTOR CO., LTD., Tokyo (JP)

(72) Inventors: Koji Onuma, Tochigi (JP); Soichiro Kamei, Tochigi (JP); Masaki Shimazu, Wako (JP); Akira Nakajima, Wako (JP); Hiromitsu Nagatomo, Wako (JP); Yuki Fukuda, Wako (JP); Toshimitsu Mizukoshi, Wako (JP); Taiji Misono, Wako (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/778,482

(22) Filed: Jan. 31, 2020

(65) Prior Publication Data
US 2020/0247270 A1    Aug. 6, 2020

(30) Foreign Application Priority Data

Feb. 1, 2019 (JP) .............................. JP2019017504
Feb. 1, 2019 (JP) .............................. JP2019017510

(51) Int. Cl.
*B60N 2/00* (2006.01)
*B60N 2/68* (2006.01)

(52) U.S. Cl.
CPC ............. *B60N 2/002* (2013.01); *B60N 2/682* (2013.01); *B60N 2/686* (2013.01)

(58) Field of Classification Search
CPC ........ B60N 2/002; B60N 2/682; B60N 2/686; B60N 2/50; B60N 2/502; B60N 2/68;
(Continued)

(56) References Cited

U.S. PATENT DOCUMENTS 2,366,680 A    1/1945 Valentine et al.
8,662,483 B2 * 3/2014 Yamaguchi .......... B60N 2/7052
267/140.4

(Continued)

FOREIGN PATENT DOCUMENTS

JP    2016144987 A    8/2016
JP    2018052498 A    4/2018
JP      6309130 B1   10/2018

*Primary Examiner* — Mark R Wendell
(74) *Attorney, Agent, or Firm* — Armstrong Teasdale LLP

(57) ABSTRACT

A vehicle seat includes an internal support member for supporting a seat occupant. The internal support member includes a main body in plate or sheet form positioned within a seat cushion frame, a pair of inclined portions extending laterally from a part of either lateral side of the main body with an upward slant, and front and rear mounting portions engaged by front and rear cross members of the seat cushion frame. A pressure sensor is mounted on a part of an upper surface of the internal support member located ahead of the inclined portions. The main body of the internal support member is provided with a pair of openings located on either side of the pressure sensor, and a connecting portion connecting the pressure sensor with a part of the front mounting portion. The pressure sensor and the openings are spaced from the front edge of the main body.

4 Claims, 14 Drawing Sheets

(58) Field of Classification Search
CPC ...... B60N 2/7094; B60N 2/70; B60N 2/7058; A47C 7/30
USPC .......................... 297/217.2, 452.52, 452.55
See application file for complete search history.

(56) References Cited

U.S. PATENT DOCUMENTS

| | | |
|---|---|---|
| 9,630,525 B2 | 4/2017 | Nakazaki et al. |
| 10,532,679 B2 | 1/2020 | Onuma et al. |
| 10,538,212 B2 * | 1/2020 | Onuma ................... B60N 2/002 |
| 10,654,385 B2 * | 5/2020 | Onuma ................... B60N 2/68 |
| 10,857,958 B2 * | 12/2020 | Onuma ................ B60N 2/5635 |
| 2007/0267282 A1 | 11/2007 | Sallam et al. |
| 2010/0133732 A1 | 6/2010 | Yamaguchi et al. |
| 2011/0248534 A1 * | 10/2011 | Pinto Ribeiro ........ B60N 2/002 |
| | | 297/217.1 |
| 2015/0283923 A1 | 10/2015 | Kordel et al. |
| 2015/0291072 A1 | 10/2015 | Ito |
| 2015/0321590 A1 | 11/2015 | Mizoi et al. |
| 2015/0343932 A1 | 12/2015 | Hosoe |
| 2016/0221481 A1 | 8/2016 | Sugiyama et al. |
| 2017/0036575 A1 | 2/2017 | Kobayashi et al. |
| 2018/0272906 A1 * | 9/2018 | Onuma ................... B60N 2/682 |
| 2018/0272908 A1 | 9/2018 | Onuma et al. |
| 2018/0272909 A1 * | 9/2018 | Misono .................... B60N 2/70 |
| 2018/0272969 A1 | 9/2018 | Onuma et al. |
| 2019/0031065 A1 * | 1/2019 | Kamei ................... B60N 2/686 |
| 2020/0247270 A1 | 8/2020 | Onuma et al. |
| 2020/0247271 A1 | 8/2020 | Onuma et al. |
| 2020/0247292 A1 | 8/2020 | Onuma et al. |
| 2020/0282885 A1 | 9/2020 | Onuma |

\* cited by examiner

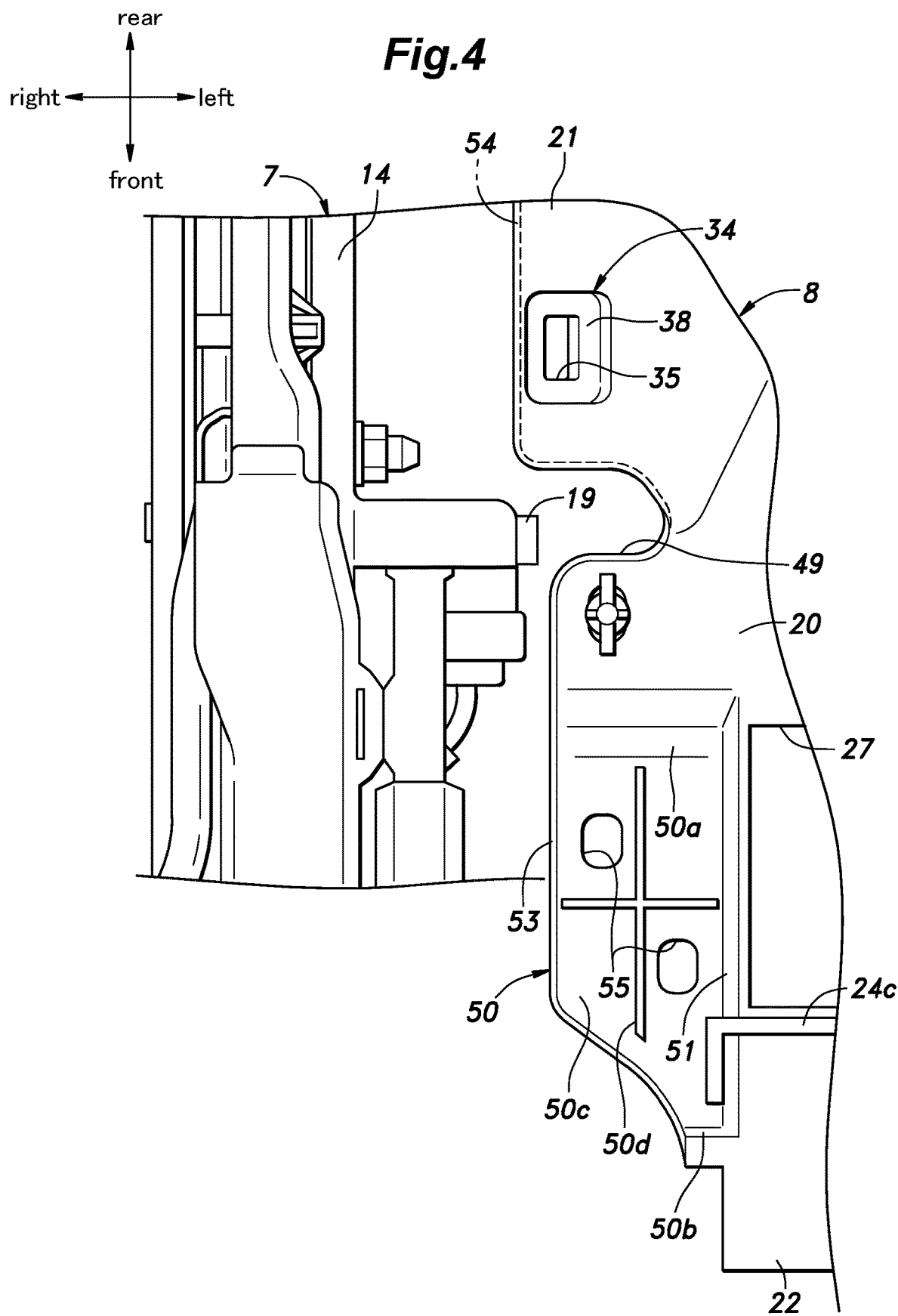

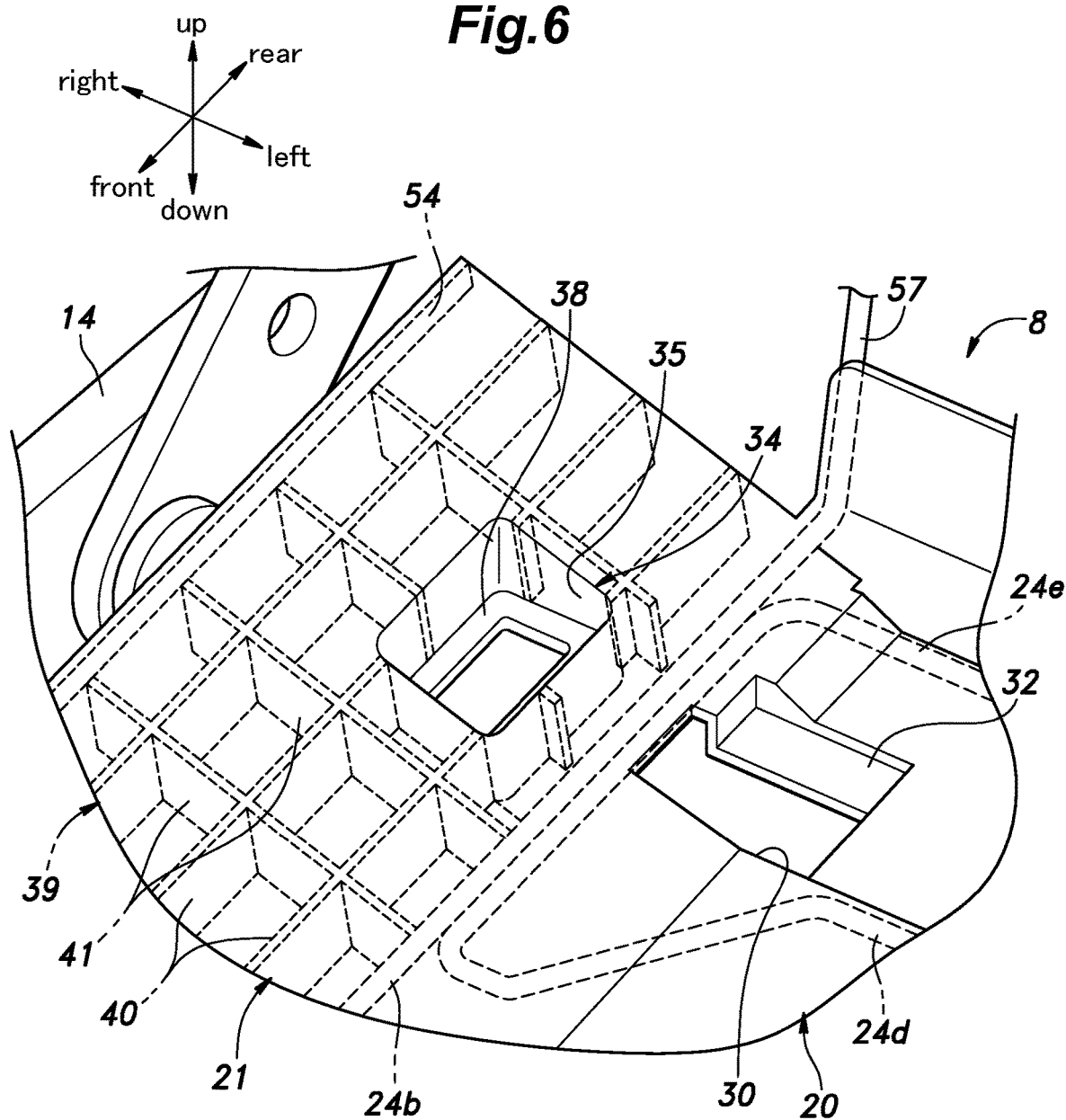

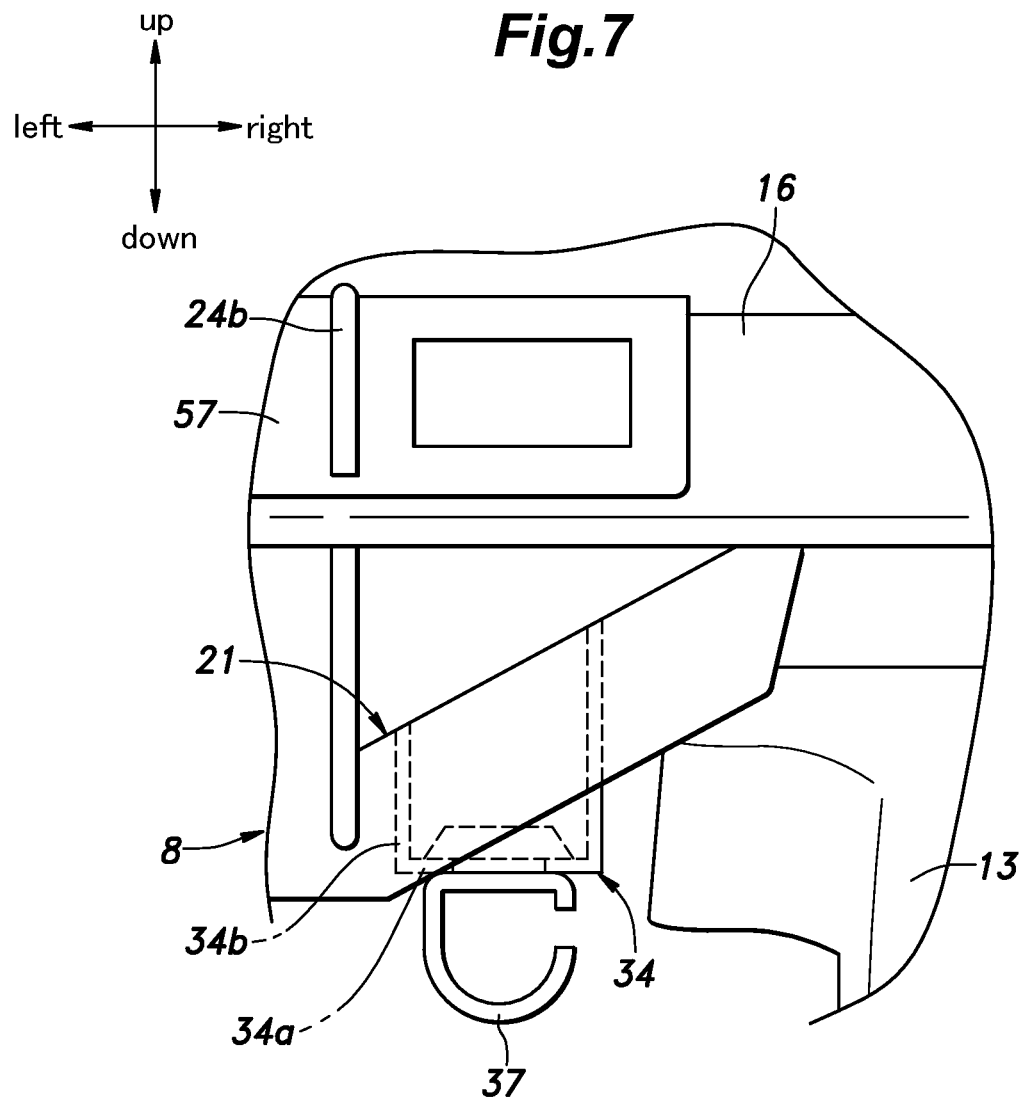

VEHICLE SEAT HAVING INTERNAL SUPPORT MEMBER

TECHNICAL FIELD

The present invention relates to a vehicle seat, and more particularly to a vehicle seat having an internal support member provided inside a seat cushion frame to support an occupant.

BACKGROUND ART

Vehicle seats provided with an internal support member are known in the art. JP6309130B1 discloses an internal support member made of a plastic sheet or plate member and placed inside a seat cushion frame to support a seat occupant. The internal support member includes a pair of inclined portions which are located on either side of a rear part thereof and inclining upward toward laterally outer sides thereof. The inclined portions support the hip of the occupant from either side thereof so that a large part of the pressure is supported by the inclined portions. In the vehicle seat disclosed in JP2016-144987A, a pressure sensor is provided between an internal support member and a seat cushion pad to detect the presence of an occupant.

When a pressure sensor is placed on an inclined portion of the internal support member, since a large part of pressure from the buttocks of the occupant is diverted to the inclined portions, the pressure sensor may not be able to accurately detect the presence of an occupant. In particular, the distinction between an actual occupant and an object such as a cargo may not be correctly made.

SUMMARY OF THE INVENTION

In view of such a problem of the prior art, a primary object of the present invention is to provide a vehicle seat having an internal support member made of a sheet or plate material having a pair of inclined portions, and a pressure sensor provided on the internal support member, and allowing the presence of an occupant to be accurately detected from the signal of the pressure sensor in spite of the presence of the inclined portions therein.

To achieve such an object, the present invention provides a vehicle seat (1) having a seat cushion (3), the vehicle seat comprising: a seat cushion frame (7) including a pair of side members (14) extending along either side of the seat cushion frame, a front cross member (15) connecting front ends of the side members to each other, and a rear cross member (16) connecting rear ends of the side members to each other; an internal support member (8) for supporting an occupant, the internal support member including a main body (20) in plate or sheet form positioned within the seat cushion frame and extending substantially in parallel with the seat cushion frame, a pair of inclined portions (21) extending laterally outward from a part of either lateral side of the main body with an upward slant, a front mounting portion (22) extending from a front edge of the main body and engaged by the front cross member, and a rear mounting portion (23) extending from a rear edge of the main body and engaged by the rear cross member; a cushion pad (9) placed on an upper side of the seat cushion frame and the internal support member; a skin member (10) covering the cushion pad; and a pressure sensor (25) mounted on a part of an upper surface of the internal support member located ahead of the inclined portions; wherein the pressure sensor aligns with a part of the front mounting portion in front view, the main body of the internal support member is provided with a pair of openings (27) located on either side of the pressure sensor, and a connecting portion (59) connecting the pressure sensor with the part of the front mounting portion aligning with the pressure sensor, and the pressure sensor and the openings are spaced from the front edge of the main body.

Since the pressure sensor is offset from the inclined portions in the fore and aft direction, the pressure from the seat occupant is prevented from being adversely influenced by the diversion of the pressure by the inclined portions. Since the openings do not support the pressure, a relatively large part of the pressure can be applied to the pressure sensor. As a result, the occupant detection device consisting of ECU or the like is enabled to detect the presence of a seat occupant from the signal of the pressure sensor in an accurate manner. Since the sensor or the sensor mounting portion and the openings are spaced from the longitudinal edges of the main body of the internal support member, and the connecting portion is provided between the pressure sensor and the front mounting portion, an excessive reduction in the stiffness of the internal support member owing to the presence of the openings can be avoided.

Preferably, the internal support member is formed by a sheet of plastic material having a wire (24) insert molded therein, and the connecting portion includes a part of the wire (24a, 24c).

Owing to the presence of the wire, a decrease in the stiffness of the connecting portion and the surrounding part of the internal support member can be made up for.

Preferably, the wire includes a plurality of longitudinal wires (24a, 24b) extending in a longitudinal direction and a plurality of lateral wires (24c, 24d, 24e) extending in a lateral direction, and at least one of the longitudinal wires (24a) and at least one of the lateral wires (24c) pass through the connecting portion.

Thus, the connecting portion can be reinforced in both the longitudinal direction and the lateral direction by the longitudinal wires and the lateral wires.

According to an embodiment of the present invention, the at least one of the lateral wires (24c) includes a first section (24ca) passing through the connecting portion and a second section (24cb) extending along an edge of the openings, the at least one of the lateral wires being bent so that the first section is offset forward relative to the second section.

Thus, the part of the internal support member adjoining the openings is reinforced by the second section of the lateral wire, and the connecting portion and the side parts of the internal support member can be further increased owing to the bent shape of the lateral wire.

Preferably, the at least one of the longitudinal wires crosses the first section of the at least one of the lateral wires, and includes a part that extends under the pressure sensor and through the front mounting portion.

Thus, owing to the longitudinal wires, the internal support member can be supported by the seat cushion frame in a stable manner, and the connecting portion can be further reinforced.

Preferably, in plan view, a center of the pressure sensor and a center of the connecting portion are located within a triangle defined by connecting a laterally central point of a rear edge of the front mounting portion and laterally inner ends of front edges of the inclined portions.

Thereby, the pressure sensor can be positioned so as to detect the seating of an occupant in an optimum fashion, and the pressure sensor can be stabilized and balanced by the connecting portion.

Preferably, the pressure sensor is offset from fixation positions of the skin member in plan view.

Since the pressure sensor is offset from fixation positions of the skin member, the arrangement for the fixation of the skin member to the seat cushion frame is prevented from adversely affecting the pressure sensor.

It is necessary that the pressure sensor is positioned so as to allow the pressure caused by the loading of a seat occupant can be detected in a reliable manner. In conventional vehicle seats, there was a risk that a clip for securing a wire harness for electric connection of the pressure sensor to the back side of the internal support member to be dislodged due to the loading of the seat occupant. In the vehicle seat according to an embodiment of the present invention having a support member in plate or sheet form having a wire insert molded therein and a pressure sensor supported by the internal support member, the pressure sensor is enabled to detect pressure in a reliable manner, and the clip for securing a wire harness or the like is prevented from being dislodged from the internal support member.

Another aspect of the present invention provides a vehicle seat (101) having a seat cushion (103), the vehicle seat comprising: a seat cushion frame (107) including a pair of side members (114) extending along either side of the seat cushion frame, a front cross member (115) connecting front ends of the side members to each other, and a rear cross member (116) connecting rear ends of the side members to each other, an internal support member (108) for supporting an occupant, the internal support member including a main body (120) in plate or sheet form made of plastic material having wired (124) insert molded therein, positioned within the seat cushion frame and extending substantially in parallel with the seat cushion frame, a front mounting portion (122) extending from a front edge of the main body and engaged by the front cross member, and a rear mounting portion (123) extending from a rear edge of the main body and engaged by the rear cross member; a cushion pad (109) placed on an upper side of the seat cushion frame and the internal support member; a skin member (110) covering the cushion pad; and a pressure sensor (125) mounted on a part of an upper surface of the internal support member so as to overlap with a part of the wire; wherein the main body of the internal support member is provided with a plurality of clip mounting portions (135) each configured to secure a wire harness (127a) electrically connected to the pressure sensor, the clip mounting portions not overlapping with the wire in plan view.

Since the pressure sensor is positioned on the wire having a higher stiffness than the plastic material, the part of the internal support member supporting the pressure sensor undergoes a relatively small deflection when subjected to the load of a seat occupant, and a relatively large part of the pressure is applied to the pressure sensor so that the pressure sensor is better able to detect the pressure. Since the part of the internal support member adjoining the wire supports a relatively large part of the load of the seat occupant, by positioning the clip mounting portions for engaging the clips for retaining a wire harness electrically connected to the pressure sensor so as not to overlap with the wire, the clips are prevented from being dislodged from the clip mounting portions under the loading of the seat occupant.

Preferably, the wire includes a plurality of longitudinal wires (124a, 124b) extending in the longitudinal direction, and at least a part of the clip mounting portions are located between the longitudinal wires.

Thereby, the space between the longitudinal wires can be advantageously utilized.

According to this aspect of the present invention, preferably, the longitudinal wires includes a central longitudinal wire (124a) provided in a laterally central part of the main body so as to partly overlap with the pressure sensor in plan view, and a pair of outer longitudinal wires (124b) extending along the side parts of the internal support member, and at least one half of the clip mounting portion provided between the central longitudinal wire and the outer longitudinal wires are located laterally outward of a center line between the central longitudinal wire and each outer longitudinal wire.

Since the clip mounting portions are in large part positioned on the side of each outer longitudinal wire, the clips are protected from being adversely affected by the loading of the occupant.

According to this aspect of the present invention, preferably, each clip mounting portion includes a hole vertically passed through the internal support member, and when the main body of the support member is divided into three equal parts consisting of a central region (A) and a pair of outer regions (B) along the lateral direction, the number of the clip mounting portions contained in each outer region is greater than the number of the clip mounting portions contained in the central region.

Thus, the stiffness of the internal support member may be reduced owing to the presence of the through holes forming the clip mounting portions in the internal support member, but the stiffness of the central region of the internal support member adjacent to the pressure sensor can be maintained.

According to this aspect of the present invention, preferably, the wires include a plurality of lateral wires (124c) extending in the lateral direction, and at least a part of the clip mounting portions are located between the lateral wires.

Thereby, the space between the lateral wires can be advantageously utilized.

According to this aspect of the present invention, preferably, the internal support member is provided with a pair of inclined portions (12) extending laterally from either side part of a rear part of the main body with an upward slant, and at least a part of the clip mounting portions are provided ahead of the inclined portions and behind the pressure sensor.

Since the inclined portions are located higher than the main body, this positioning of the clip mounting portions prevents the loading of the occupant from being applied to the clips.

According to this aspect of the present invention, preferably, the main body is located lower than the upper end of the front mounting portion, and at least a part of the clip mounting portions are located within a triangle (C) connecting a laterally central point of the rear edge of the front mounting portion, and the inner ends of the front edges of the inclined portions.

Thereby, the front mounting portion and the inclined portions are located higher than the main body so that the loading of the seat occupant is prevented from being applied to the clips by positioning the clip mounting portions in the triangular region.

According to this aspect of the present invention, preferably, the main body of the internal support member is provided with an opening (128), and the wire harness is placed under the internal support member, and is secured to the clips so as to overlap with the opening in plan view.

Thereby, the mounting state of the wire harness placed underside of the internal support member can be inspected from above.

Yet another aspect of the present invention provides a vehicle fitted with a pair of vehicle seats which are configured as discussed above, and the clip mounting portions are arranged symmetric about a longitudinal center line in plan view.

When a common internal support member is used for the two vehicles seat, the wire harness or the like which is secured to the internal support member via the clips can be arranged in a symmetric manner about the longitudinal center line.

According to a certain embodiment of the present invention, since the pressure sensor is offset from the inclined portions in the longitudinal direction, the diversion of the pressure by the inclined portions is prevented from affecting the pressure sensor. Furthermore, since the openings do not support the loading of the occupant, the pressure applied to the pressure sensor is amplified so that the detection accuracy of the occupant detection system based on the signal from the pressure sensor can be improved. Since the mounting portion and the openings are spaced from the longitudinal edges of the main body of the internal support member, and the connecting portion is provided between the pressure sensor and the front mounting portion, the reduction in the stiffness of the internal support member due to the presence of the openings can be mitigated.

According to a certain embodiment of the present invention, the stiffness of the connecting portion and the surrounding part which may be reduced owing to the openings can be made up for by the use of the wire.

According to a certain embodiment of the present invention, the stiffness of the connecting portion is reinforced both in the lateral direction and the longitudinal direction by the longitudinal wires and the lateral wires.

According to a certain embodiment of the present invention, the part of the main body of the internal support member surrounding the openings can reinforced by the second section of one of the lateral wires, and the connecting portion and the side parts of the support member can be further reinforced by the bent configuration of the lateral wire.

According to a certain embodiment of the present invention, owing to the longitudinal wires, the internal support member supported by the seat cushion frame is stabilized, and the connecting portion is further reinforced.

According to a certain embodiment of the present invention, a center of the pressure sensor and a center of the connecting portion are located within a triangle defined by connecting a laterally central point of a rear edge of the front mounting portion, and laterally middle points of the front edges of the inclined portions so that the pressure sensor is positioned so as to optimally detect the seating of an occupant, and the pressure sensor is stabilized since the connecting portion is placed in a laterally balanced position.

According to a certain embodiment of the present invention, since the pressure sensor is offset from the fixation positions of the skin member, the influence from the fixation positions of the skin member to the pressure sensor can be minimized.

BRIEF DESCRIPTION OF THE DRAWING(S)

FIG. 4 is a fragmentary plan view of a side part of an internal support member and a side member of the vehicle seat;

FIG. 6 is a fragmentary perspective view of the inclined portion of the internal support member with the pad and the skin member omitted from illustration;

FIG. 7 is a fragmentary rear view of the inclined portion;

DESCRIPTION OF THE PREFERRED EMBODIMENT(S)

The vehicle seat 1 according to the preferred embodiments of the present invention is described in the following with reference to the appended drawings. The various directions mentioned in the following disclosure will be based on the view point of an occupant seated on the vehicle seat.

First Embodiment

Figure 1:
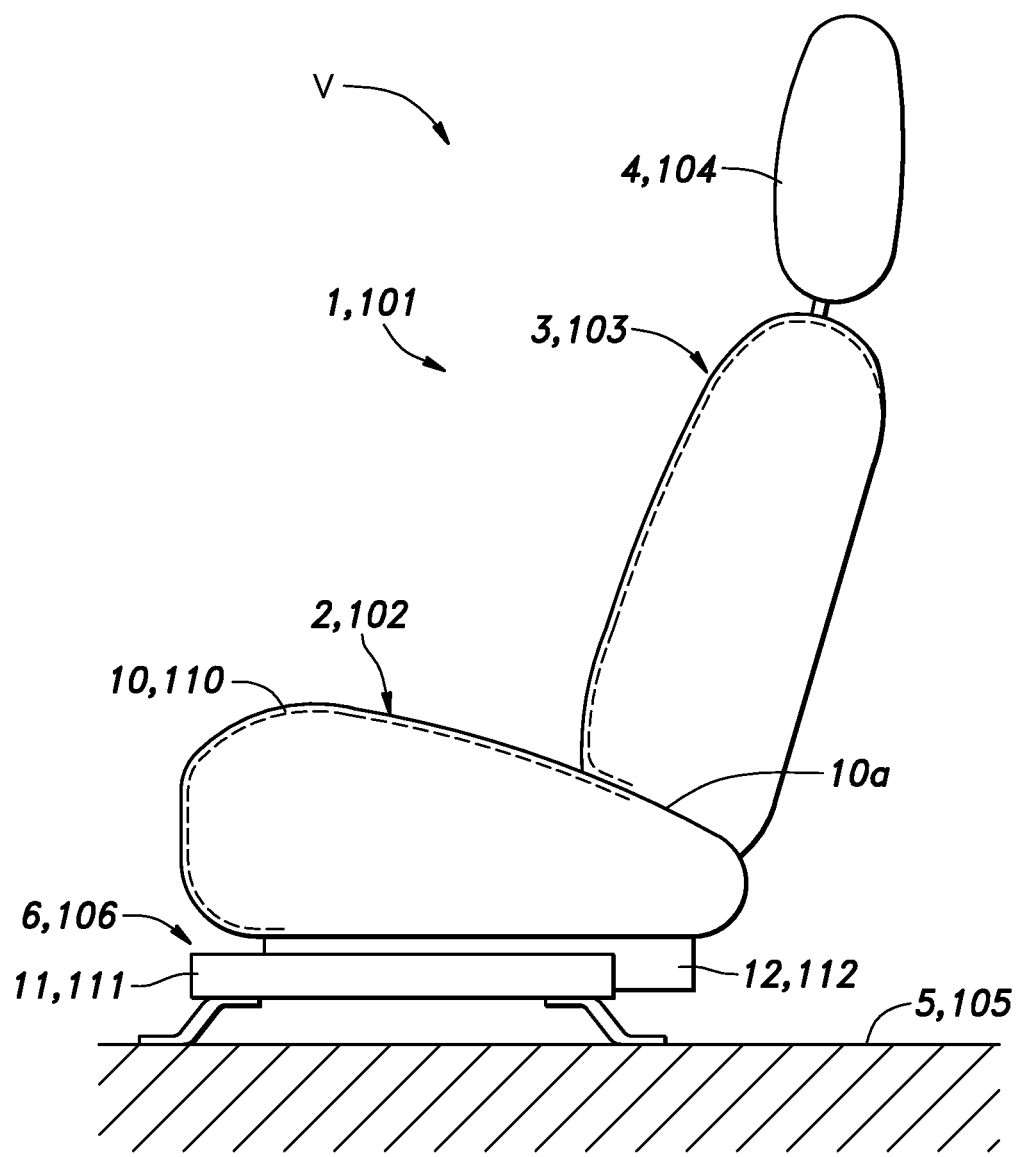
FIG. 1 is a schematic side view of a vehicle seat according to a first embodiment and a second embodiment of the present invention.

The vehicle seat 1 illustrated in FIG. 1 may be used either as a driver's seat or a passenger seat, and includes a seat cushion 2, a seat back 3, and a headrest 4 in a per se known manner. The seat cushion 2 is supported by a floor 5 of a passenger compartment of the vehicle via a pair of slide rails 6. The vehicle seat 1 includes a seat cushion frame 7, a cushion pad 9 made of urethane foam or the like, and placed on the seat cushion frame 7 via an internal support member 8 (FIG. 2), and a skin member 10 covering the cushion pad 9. Each slide rail 6 consists of a lower rail 11 fixed to the floor 5, an upper rail 12 slidably supported by the lower rail 11, and fixed to the seat cushion frame 7 so that the fore and aft position of the vehicle seat 1 may be adjusted, and a rail cover 13 covering at least a part of the upper rail 12.

Figure 2:
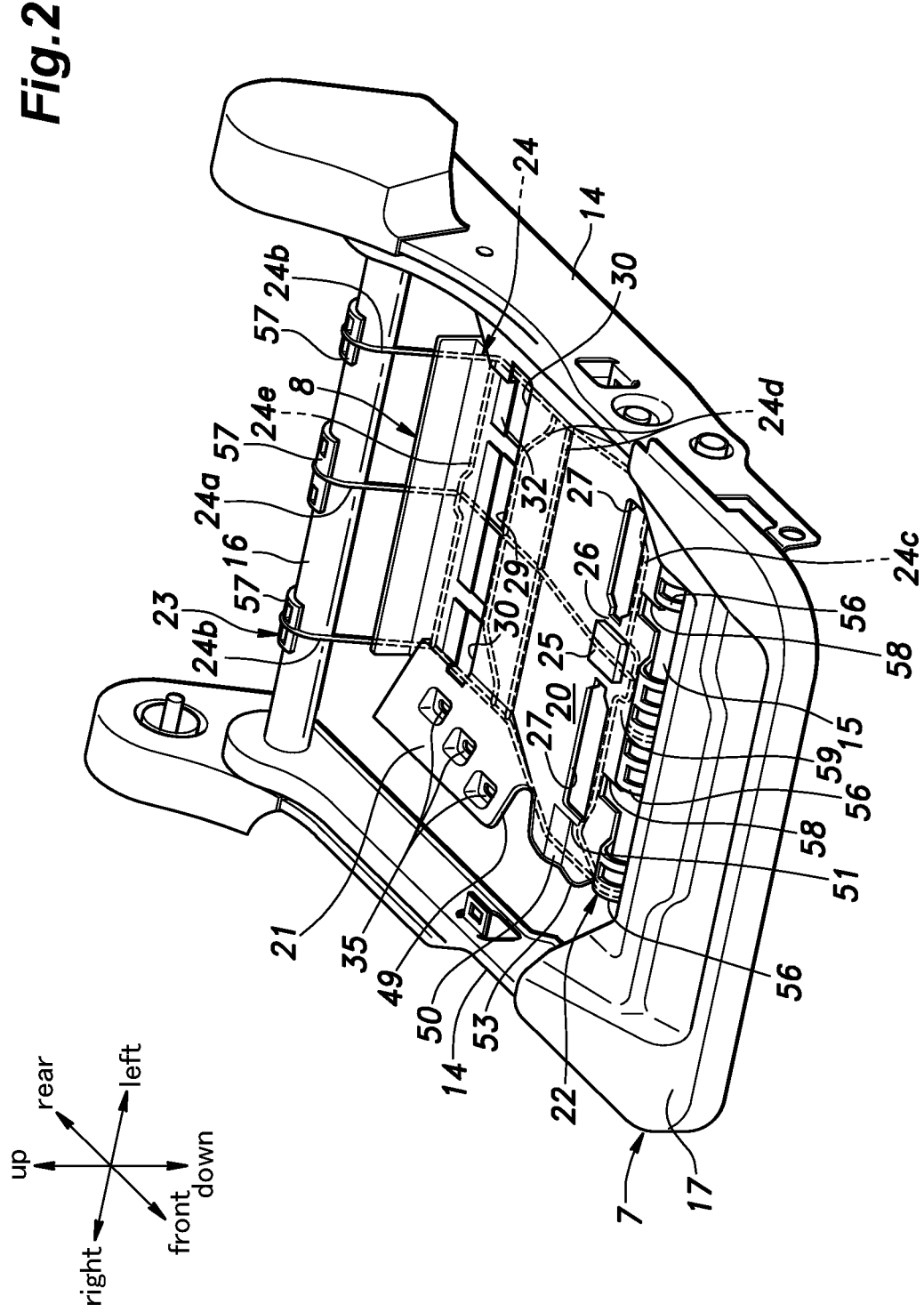
FIG. 2 is a perspective view of a seat cushion frame and an internal support member of a vehicle according to the first embodiment.

As shown in FIG. 2, the seat cushion 2 includes the seat cushion frame 7 having a rectangular configuration in plan view, and the internal support member 8 which is supported by the seat cushion frame 7 inside the seat cushion frame 7, and resiliently supports the load of the occupant via the skin member 10, and the cushion pad 9.

The seat cushion frame 7 includes a pair of side members 14 extending along either side thereof, a front cross member 15 connecting the front ends of the side members 14 to each other, a rear cross member 16 connecting the rear ends of the side members 14 to each other, and a pan frame 17 connected to the front ends of the left and right side members 14, and generally located ahead of the front cross member 15. Each side member 14 consists of a metal member elongated in the fore and aft direction, and having a pair of flanges extending laterally from the upper and the lower edges thereof, respectively. The side members 14 are each supported by the upper rail 12 via a base member 65. The front cross member 15 and the rear cross member 16 each consist of a metal pipe member elongated in the lateral direction. The pan frame 17 consists of a stamp formed sheet metal, and is provided with a contoured surface substantially conforming to the front part of the seating surface. As shown in FIG. 4, the right side member 14 is provided with a position sensor 19 for detecting the fore and aft position of the vehicle seat 1 relative to the floor 5.

As shown in FIG. 2, the internal support member 8 is supported by the seat cushion frame 7 so as to be located within the seat cushion frame 7. The internal support member 8 includes a main body 20 in sheet or plate form extending substantially in parallel with the seat cushion frame 7, a pair of inclined portions 21 extending obliquely upward toward the corresponding lateral outer side edge thereof from either lateral edge of a rear portion of the main body 20, a front mounting portion 22 extending forward from a front edge of the main body 20 and secured to the front cross member 15, and a rear mounting portion 23 extending rearward from a rear edge of the main body 20, and secured to the rear cross member 16. The part of the main body 20 which is located ahead of a middle point of the rear portion with respect to the longitudinal direction may be slightly inclined upward toward the front end of the main body 20. The internal support member 8 is formed by a plastic sheet material, and is provided with wires 24a insert molded in the plastic sheet material so as to resiliently support the seat occupant by deflecting under the load of the seat occupant.

The vehicle seat 1 is fitted with a seat belt reminder (SBR) system that issues a warning when the seat occupant is seated on the vehicle seat 1 without wearing the seat belt, and is therefore provided with a pressure sensor 25. A sensor mounting portion 26 for supporting the pressure sensor 25 is provided on the upper surface of a laterally middle part of the front portion 50 of the main body 20. The pressure sensor 25 detects the pressure on the seat cushion 2 to determine the presence of a seat occupant seated on the vehicle seat 1. The laterally middle part of the rear portion of the main body 20 receives a relatively small pressure from the seated occupant because the pressure of the occupant is diverted to the inclined portions 21. To avoid the influences of the diversion of the pressure by the inclined portions 21, the pressure sensor 25 is placed so as to be offset from the inclined portions 21 in the forward direction. Thereby, the accuracy of a seating determination unit typically consisting of ECU in determining the presence of a seat occupant from the signal of the pressure sensor 25 can be improved. Further, the pressure sensor 25 is offset from a fixation position 10a or a listing engagement position of the skin member 10 (FIG. 1).

The vehicle seat 1 (see FIG. 1) is fitted with an air ventilation system that improves the seating comfort by drawing or blowing air into or out of the surface of the vehicle seat 1 so as to control humidity. A pair of air openings 27 are formed on either side of the sensor mounting portion 26 of the main body 20 to provide passages for the air. Each air opening 27 is rectangular in shape in plan view, and central longitudinal wire 24 extending in the longitudinal direction is buried in the plastic material forming the sensor mounting portion 26 interposed between the two air openings 27.

The rear portion of the main body 20 is provided with a central engagement hole 29 located in a laterally central position and a pair of outer engagement holes 30 located on either side of the central engagement hole 29, which are passed through the main body 20 to engage a plurality of hooks 28 (see FIG. 5) attached to the edge of the skin member 10 and to adjust the deflection of the support member 8. The central engagement hole 29 and the outer engagement holes 30 are each rectangular in shape in plan view. The central engagement hole 29 and the outer engagement holes 30 that are thus arranged in the lateral direction have a same longitudinal length, but the central engagement hole 29 has a larger lateral width than the outer engagement holes 30. As a result, the central part of the internal support member 8 is relatively flexible so that a soft seating feel can be achieved. By this differentiating the longitudinal lengths of the central engagement hole 29 and the outer engagement holes 30, the flexibility of the internal support member 8 can be controlled so as to provide an optimum seating comfort. Since the central longitudinal wire 24 passes centrally through the central engagement hole 29, the part of the internal support member 8 surrounding the central engagement hole 29 can be increased.

Figure 5C:
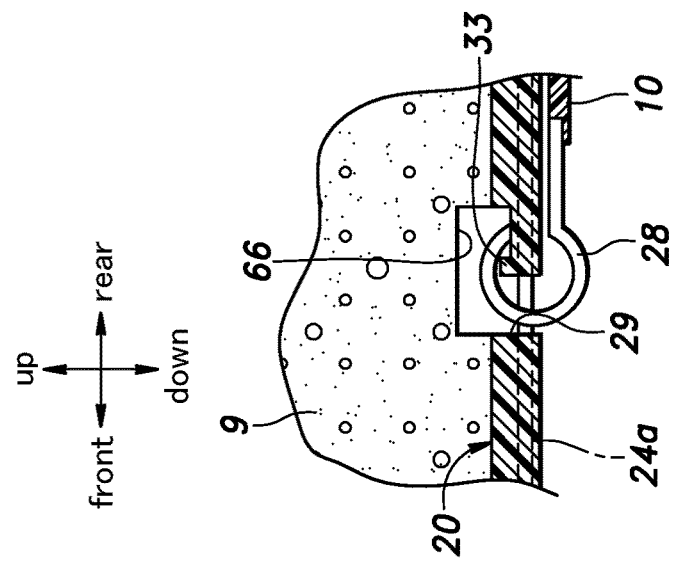
FIG. 5C is a view similar to FIG. 5B showing a modification of the first embodiment.
Figure 5B:
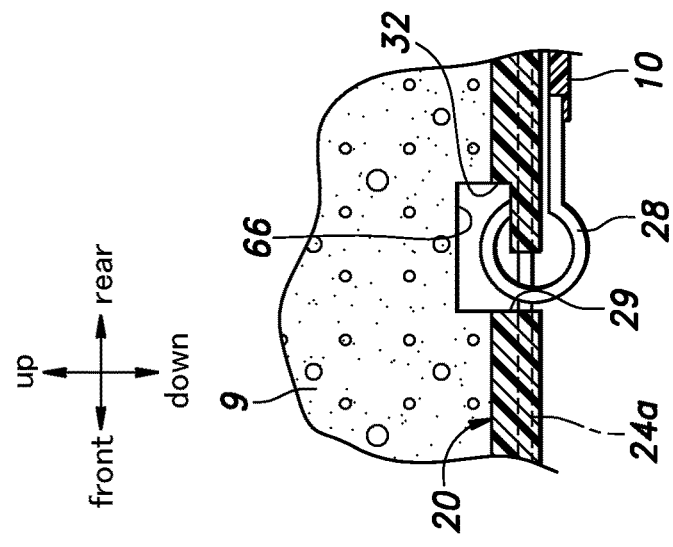
FIG. 5B is a fragmentary sectional view of the arrangement for engaging an edge of a skin member to the internal support member.
Figure 5A:
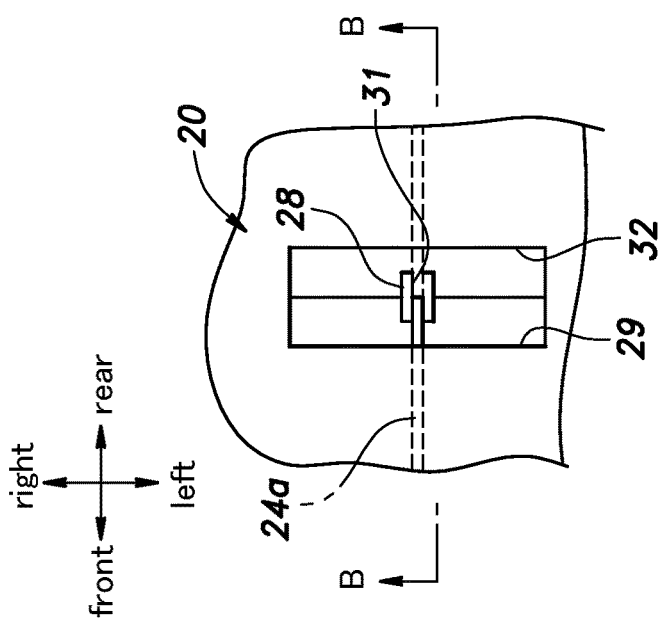
FIG. 5A is a fragmentary plan view of an arrangement for engaging an edge of a skin member to the internal support member.
Figure 8:
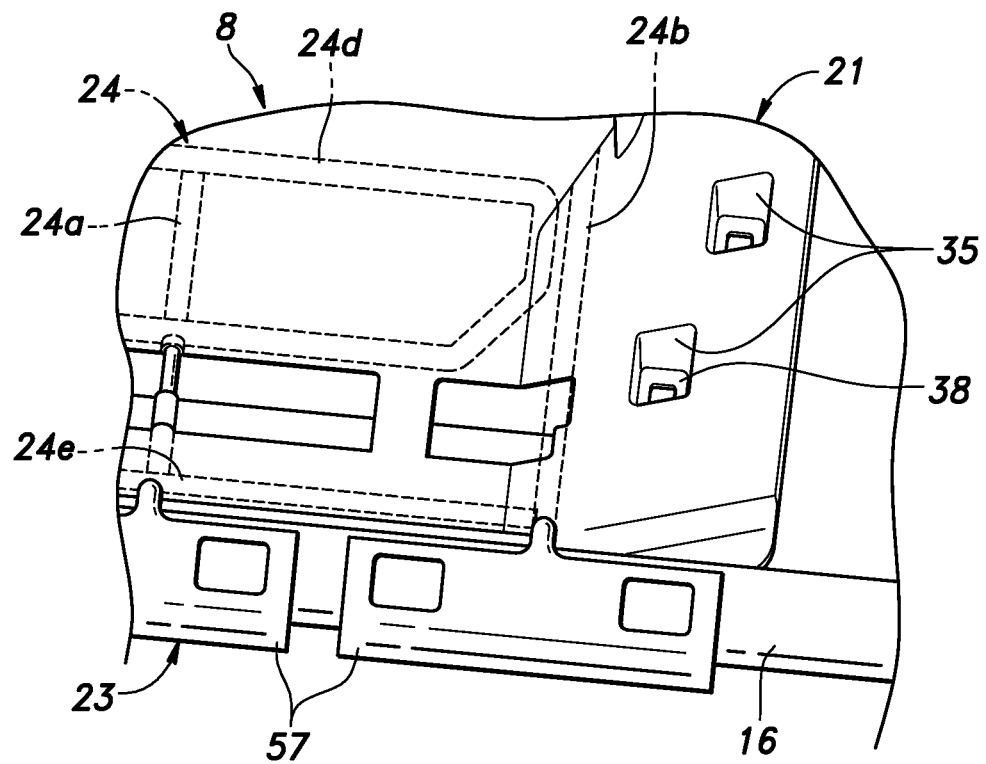
FIG. 8 is a fragmentary perspective view of the inclined portion as viewed from behind.

As shown in FIG. 5A, the hook 28 engaged by the central engagement hole 29 is provided with a slot 31 for receiving the central longitudinal wire 24 so that the engagement strength of the hook 28 in engaging the central engagement hole 29 is increased. Owing to the presence of the slot 31, the hook 28 to be engaged by the central engagement hole 29 is different in shape and wider as compared to the hooks 28 to be engaged by the outer engagement holes 30. By thus varying the shape and the width of the hooks 28 depending on which of the engagement holes the hooks are to be engaged by, the worker is prevented from engaging the hook 28 on wrong engagement holes. Since the central engagement hole 29 and the outer engagement holes 30 are spaced from the rear mounting portion 23, the work efficiency is increased. Since the skin member 10 can be engaged by the internal support member 8, the seat cushion frame 7 is not required to be provided with projecting pieces as engagement portions for the purpose of attaching the skin member 10 to the seat cushion frame 7, the size and weight of the seat cushion frame 7 can be minimized.

As shown in FIGS. 2 and 5, a hook recess 32 is provided on the upper side of the rear edge of each of the central engagement hole 29 and the outer engagement holes 30. Each hook 28 is thus passed upward through the corresponding central engagement hole 29 or the outer engagement hole 30, and received by the corresponding hook recess 32 at tip end of the hook 28. By thus receiving each hook 28 in the corresponding hook recess 32, the hook 28 can be positioned relative to the corresponding central engagement hole 29 or the outer engagement hole 30.

Alternatively or additionally to the hook recess 32, a hook edge wall 33 may be provided on the upper surface of the rear edge of the central engagement hole 29 to engage the tip end of the corresponding hook 28. (The same arrangement may also be made to each outer engagement hole 30.) By engaging the tip ends of the hooks 28 with the corresponding hook edge walls 33, the hooks 28 are prevented from being dislodged from the central engagement hole 29 and the outer engagement holes 30. Since the central engagement hole 29 and the outer engagement holes 30 are aligned with the inclined portions 21 of the main body 20 or the parts of the main body 20 having a relatively high stiffness, the central engagement hole 29 and the outer engagement holes 30 are prevented from deforming so that the hooks 28 can be prevented from being dislodged from the central engagement hole 29 and the outer engagement holes 30 in a reliable manner.

As shown in FIGS. 2, 3 and 6 to 8, each inclined portion 21 is formed with a tubular portion 34 projecting downward (in the orthogonal direction relative to the main body 20). The inner bore of the tubular portion 34 defines a mounting hole 35 for receiving a clip 37 for retaining another member to the internal support member. The inner circumferential surface of the tubular portion 34 is provided with a shoulder surface 38 for engaging the tip end of the clip 37 as well as for increasing the stiffness of the tubular portion 34. For instance, the tubular portion 34 includes a bottom wall 34a which is rectangular in shape in plan view and formed with a through hole for passing through the clip 34, and a side wall 34b extending upward from the periphery of the bottom wall 34a. The upper surface of the bottom wall 34a provides the shoulder surface 38.

The lower end of the tubular portion is positioned on the same horizontal plane as the lower surface of the main body 20. Since the mounting hole 35 extends orthogonally to the main body, the assembly work in securing the clip 37 to the inclined portion 21 from the back side (lower side) thereof is facilitated, and can be performed in a similar fashion as with the main body 20 because the mounting hole 35 extends orthogonally to the main body 20. More specifically, the clip 37 is not required to be inserted at an angle to the tubular portion 34. Owing to the shoulder surface 38, the tip end of the clip 37 does not protrude from the upper surface of the inclined portion 21 so that the clip 37 is prevented from adversely affecting the seating comfort of the vehicle seat 1. The central engagement hole 29 and the outer engagement holes 30 are offset from the fixation position 10a or the listing engagement position of the skin member 10 in the longitudinal direction. When the skin member 10 is secured also to each side member 14, the fixation position of the skin member 10 to each side member 14 may be offset from the inclined portions 21 in the longitudinal direction.

The back side of each inclined portion is provided with a grid reinforcement portion 39 which includes a plurality of longitudinal ribs 40 projecting downward and extending in the longitudinal direction, and a plurality of lateral ribs 41 projecting downward and extending laterally along the inclined portions 21. The grid reinforcement portion 39 creases the stiffness of the inclined portions 21 so that the deformation of the inclined portions 21 can be reduced, and additionally stabilizes the position of the internal support member 8 relative to the seat cushion frame 7. The tubular portions 34 may be placed in the grid reinforcement portion 39 so that a part of longitudinal ribs 40 and/or the lateral ribs 41 are connected to the tubular portions 34 so that the decrease in the stiffness of the inclined portions due to the presence of the mounting hole 35 in each tubular portion may be made up for. The lower edge of each lateral rib 41, which is connected to the tubular portion 34, is substantially at the same elevation as the lower end of the tubular portion 34 or lower in the part of the lower edge of the lateral rib 41 which is located laterally inward of the tubular portion 34. This part of the lateral rib 41 increases the stiffness of the tubular portion 34 over the entire vertical length thereof. This part of the lateral rib 41 may be internally provided with a rib wire 24f. The rib wire 24f located at the same elevation as the lower end of the tubular portion 34 or lower. The part of the main body 20 surrounding the central engagement hole 29 and the outer engagement holes 30 is increased in stiffness owing to the presence of the tubular portion 34 reinforced by the longitudinal rib 40 and the lateral ribs 41.

Figure 11:
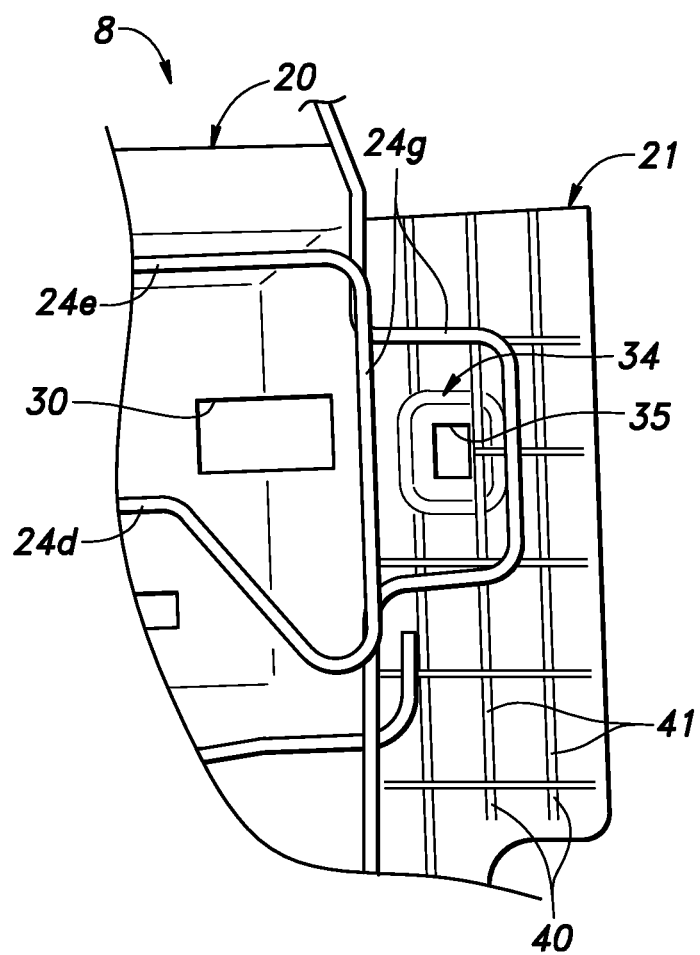
FIG. 11 is a fragmentary bottom view of the inclined portion according to a modification of the first embodiment.

As in the case of the modified embodiment shown in FIG. 11, an annular wire 24g may be placed around the tubular portion 34. In this case, the annular wire 24g may be arranged so as to cross a part of the longitudinal ribs 40 and the lateral ribs 41.

As shown in FIG. 4, a side notch 49 is formed on each side edge of the internal support member 8 so as to separate the main body 20 and the corresponding inclined portion 21 located in the rear portion of the internal support member 8. A position sensor 19 is mounted to a part of the side member 14 which substantially coincides with the side notch 49 in terms of the longitudinal positioning. The presence of the side notches 49 reduces the size and weight of the internal support member 8, and allows the mounted state of the position sensor 19 to be inspected. The side notch 49 may be provided only on the side of the internal support member 8 where the position sensor 19 is provided. The seat cushion frame 7 and the support member are substantially mirror symmetric with respect to the longitudinal center line except for that the position sensor 19 is provided only on one side the seat cushion frame 7.

As there is no inclined portion 21 ahead of the side notches 49, the side edges of the main body 20 are the edges of the internal support member 8. The longitudinal length of the front portion is smaller than the longitudinal length of the inclined portions 21, and the laterally outer edges of the front portion 50 are located more inward than the laterally outer edges of the inclined portions 21. Therefore, the load acting on the front portion 50 is relatively small, and the load acting on the rear portion is diverted to the laterally outer parts thereof. As a result, the overall mechanical strength of the internal support member 8 is increased. Each laterally outer part of the front portion 50 of the main body 20 is formed with a crank portion 50a in which the front part thereof is lower than the rear part thereof in side view so that the reduction in stiffness caused by the creation of the side notches 49 is made up for. Since the front part of the crank portion 50a is lower than the rear part thereof, the impact of the crank portion 50a on the legs of the occupant is minimal. When another member is attached to the back side of the lower part of the crank portion 50a, the tip end of the clip (not shown in the drawings) which projects upward from the surface of the lower part of the crank portion 50a is prevented from adversely affecting seating comfort on account of the elevated rear part of the crank portion 50a. Even though the front part of the crank portion 50a is lowered, since the buttocks of the occupant are supported by the rear part of the crank portion 50a, the influences of the crank portion 50a on the capability of the internal support member 8 to support the buttocks of the occupant is very slight. The part of the internal support member located laterally outward of each air opening 27 is provided with a bent portion 51 which has a bent shape in front view so as to be connected to the lowered part of the corresponding crank portion 50a in the laterally outer part of the front portion 50 of the main body 20. The bent portion 51 extends from a part adjoining the air opening 27 to a part adjoining the front edge of the main body 20. The bent portions 51 make up for the reduction in the stiffness of the main body 20 by the air openings 27. Thus, a recess 50c is defined in a front part of each side part of the front portion 50 is defined by the crank portion 50a, the bent portion 51, and a front wall extending laterally outward from the front end of the bent portion 51. The recesses 50c improves the stiffness of the surrounding part of the main body 20, the two outer side parts of the front mounting portion 22 can be attached to the front cross member 15 in a highly stable manner. The surface of each recess 50c may be provided with a laterally extending rib 50b.

Figure 3:
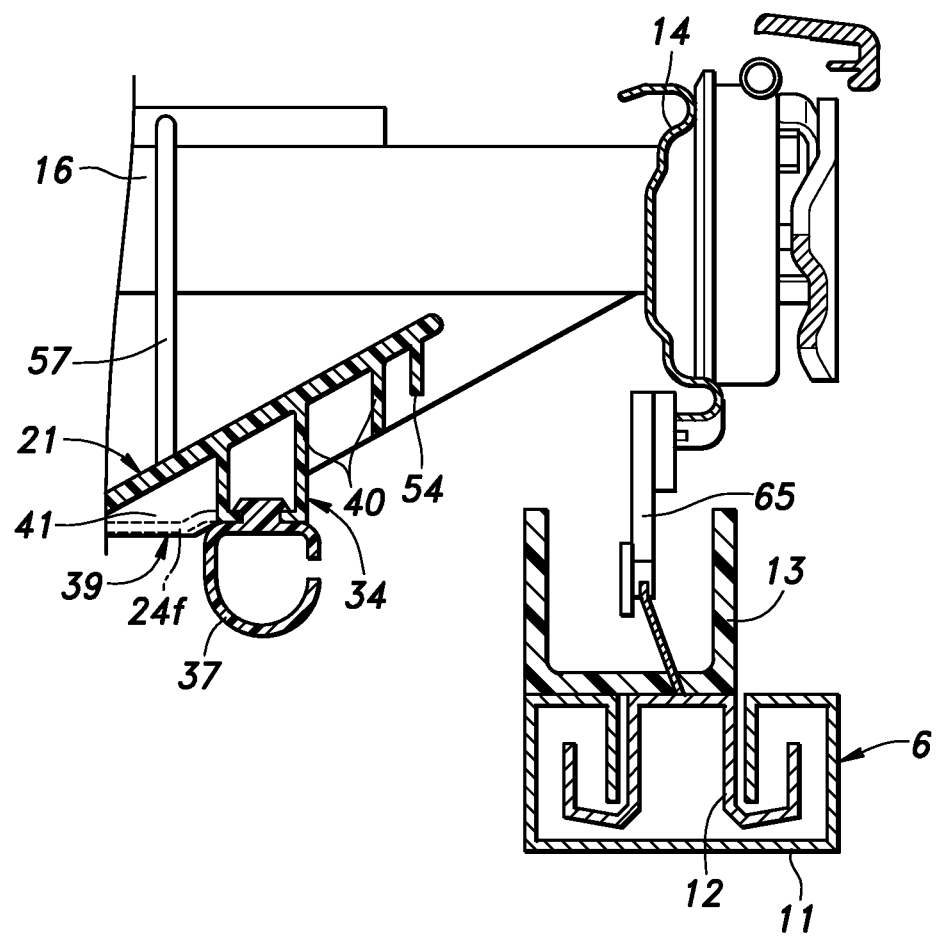
FIG. 3 is a fragmentary sectional rear view of an inclined portion and an adjoining part of the vehicle seat.

As shown in FIGS. 3 and 4, each side edge of the front portion 50 of the main body 20 is provided with a flange 53 that projects upward for increasing the stiffness of the side edge of the internal support member, and the side edge of each inclined portion 21 is provided with a flange 54 that projects downward. Each flange 53 extends over a fore and aft range of the bent portion 51. For the purpose of increasing the stiffness, the rear end part of each flange 53 may extend to a part where the inclined portion 21 is delimited by the side notch 49. When a clip (not shown in the drawings) is inserted into a hole 55 formed in a part of the main body 20 adjoining the side edge of the front portion of the main body 20, the tip end of the clip project upward from the main body 20. The upwardly projecting flange 53 mitigates the influences of the projecting tip end of the clip on the seating comfort. Meanwhile, since the mounting hole 35 of each inclined portion 21 is provided with the shoulder surface 38, the tip end of the clip 37 inserted into the mounting hole 35 does not project upward from the inclined portion 21. Therefore, the flange 54 of each inclined portion 21 projects downward so as not to affect the seating comfort.

As shown in FIG. 2, the wires 24 buried in the plastic material forming the internal support member 8 include those extending in the lateral direction, and these wires increase the stiffness of the surround parts of the internal support member 8. The front lateral wire 24c is positioned along the front edges of the air openings 27, and the central lateral wire 24d is positioned between the air openings 27 and the engagement holes (the central engagement hole 29 and the outer engagement holes 30), and the rear lateral wire 24e is positioned along a part adjacent to the rear edges of the main body or behind the central engagement hole 29 and the outer engagement holes 30. A part of the central lateral wire 24d extends along the front edges of the central engagement hole 29 and the outer engagement holes 30.

The front mounting portion 22 is engaged by the front cross member 15 from above, and includes three front mounting pieces 56 which are separated from each other for the convenience of handling. Similarly, the rear mounting portion 23 is engaged by the rear cross member 16 from above, and includes three rear mounting pieces 57 which are separated from each other for the convenience of handling. The end portions of the central longitudinal wire 24a and the outer longitudinal wires 24b are buried in the corresponding front mounting pieces 56 and the corresponding rear mounting pieces 57 to reinforce the front mounting pieces 56 and the rear mounting pieces 57.

Parts of the front edge of the main body 20 where the front mounting pieces 56 are absent are each provided with a front notch 58. The lateral width of each front notch 58 is smaller than the distance between the adjacent front mounting pieces 56. Thus, the space defined by the front edge of the main body 20 and each adjoining pair of front mounting pieces 56 is indented in plan view. Owing to the presence of the front notches 58, the deflection stroke of the part ranging from the front edge of the main body 20 and the front mounting pieces 56 can be increased so that the mounting of the front mounting pieces 56 to the front cross member 15 can be facilitated. Since the lateral width of each front notch 58 is smaller than the distance between the adjacent front mounting pieces 56, the presence of the front notches 58 does not impair the seating comfort.

Figure 12:
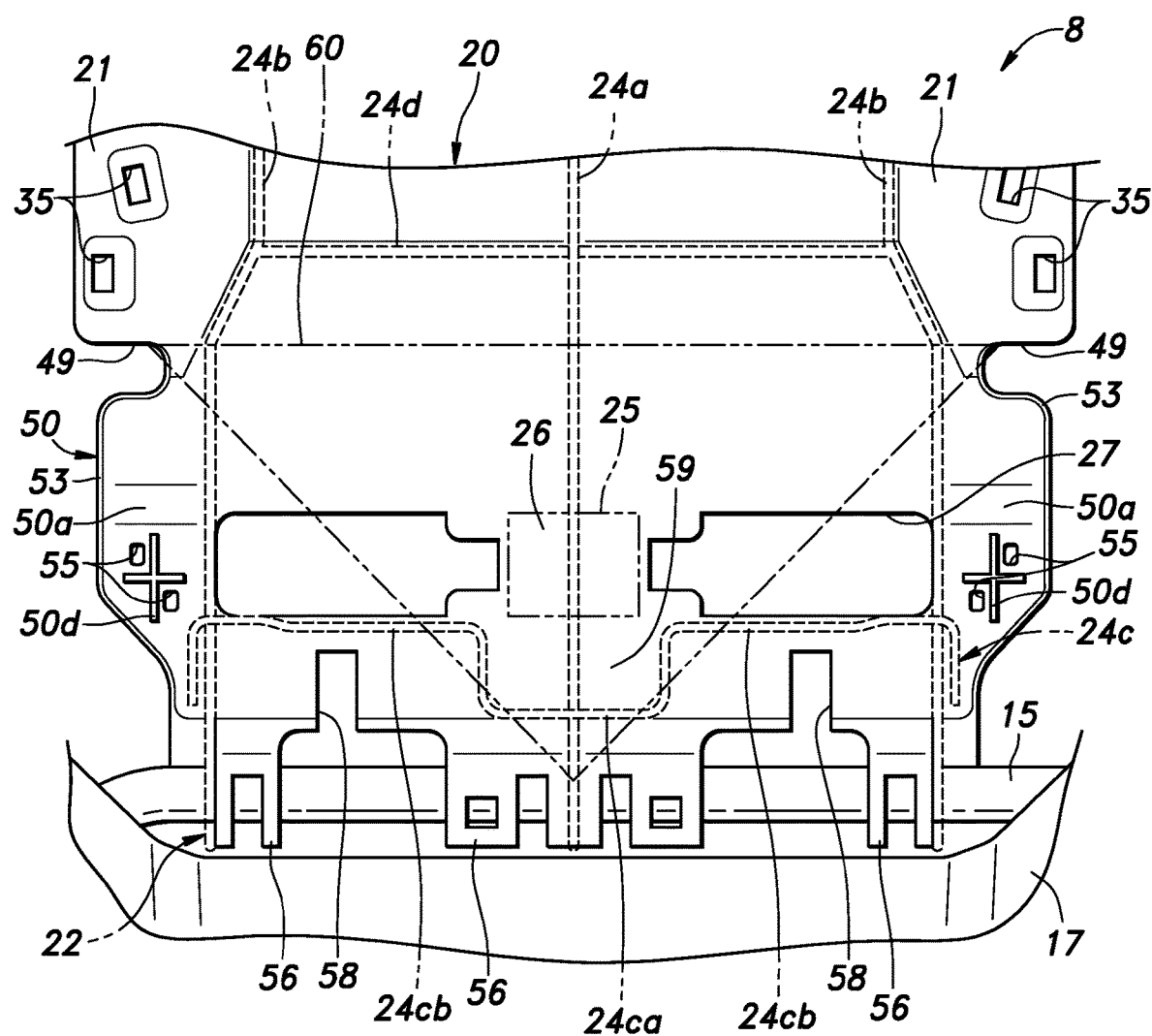
FIG. 12 is a plan view of a front part of the internal support member of the first embodiment.

As shown in FIGS. 2 and 12, the part of the main body 20 located between the sensor mounting portion 26 and the central front mounting piece 56 forms a connecting portion 59 in which the central longitudinal wire 24a and the front lateral wire 24c are buried. The central longitudinal wire 24a and the front lateral wire 24c cross each other in the connecting portion 59. Owing to the presence of the air openings 27 and the front notches 58, the stiffness of the laterally central part of the front portion 50 of the main body 20 is reduced, but the connecting portion 59 ensures an adequate stiffness in this region. Each front mounting piece 56 is formed as a hook extending in a substantially forward direction, and each rear mounting piece 57 is formed as a hook extending in an oblique upward and rearward direction from the rear edge of the main body 20. The central points of the pressure sensor 25 and the connecting portion 59 are preferably located laterally central parts of the main body 20 in view of stabilizing the pressure sensor 25, and preferably within a triangle defined by connecting the laterally central point of the rear edge of the front mounting portion, and the inner ends of the front edges of the inclined portions 21.

The central longitudinal wire 24 extends from the central front mounting piece 56 to the central rear mounting piece 57 via the connecting portion 59 and the sensor mounting portion 26. The front lateral wire 24c includes a first section 24ca extending along the front edge of the laterally central part of the main body 20, and a pair of second sections 24cb located along the front edges of the air openings 27 while avoiding the front notches 58. Since the first section 24ca is positioned more forward than the second sections 24cb, the front lateral wire 24c is bent in a corresponding manner. The lateral end sections of the front lateral wired 24c each extend forward, and laterally outward beyond the corresponding bent portion 51, along the corresponding flange 53 so that the front corners of the main body 20 can be reinforced without increasing the size of the internal support member 8.

The pad 9 (see FIG. 5) is preferably provided on the front mounting pieces 56 of the support member 8 as well. In such a case, since the loading of the occupant is applied to the front mounting pieces 56 via the pad, the engagement strength of the front mounting pieces 56 engaging with the front cross member 15 from above can be increased.

As shown in FIGS. 5B and 5C, the part of the pad 9 opposing each hook 28 is formed with a hook receiving portion 66 which is recessed upward. The hook receiving portion 66 prevents interference between the pad 9 and the hook 28 so that the assembly work in mounting the hooks 28 to the front engagement hole and the outer engagement holes 30 is facilitated. In order to prevent the dislodging of the hooks 28, the part of the pad 9 opposing each hook 28 may be configured to be pressed onto the hook 28, instead of being formed with a hook receiving portion 66.

Figure 9:
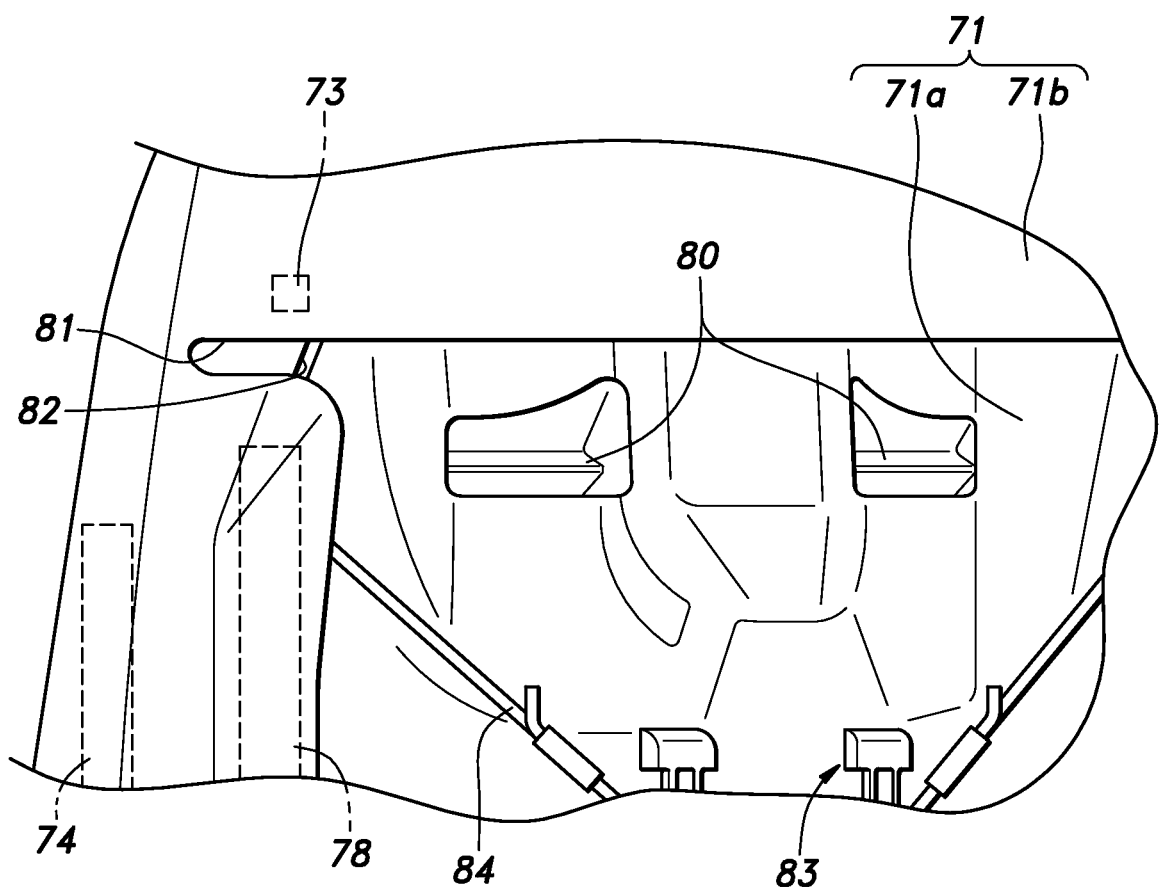
FIG. 9 is a fragmentary rear view of a pad in a seat back of the vehicle seat.
Figure 10:
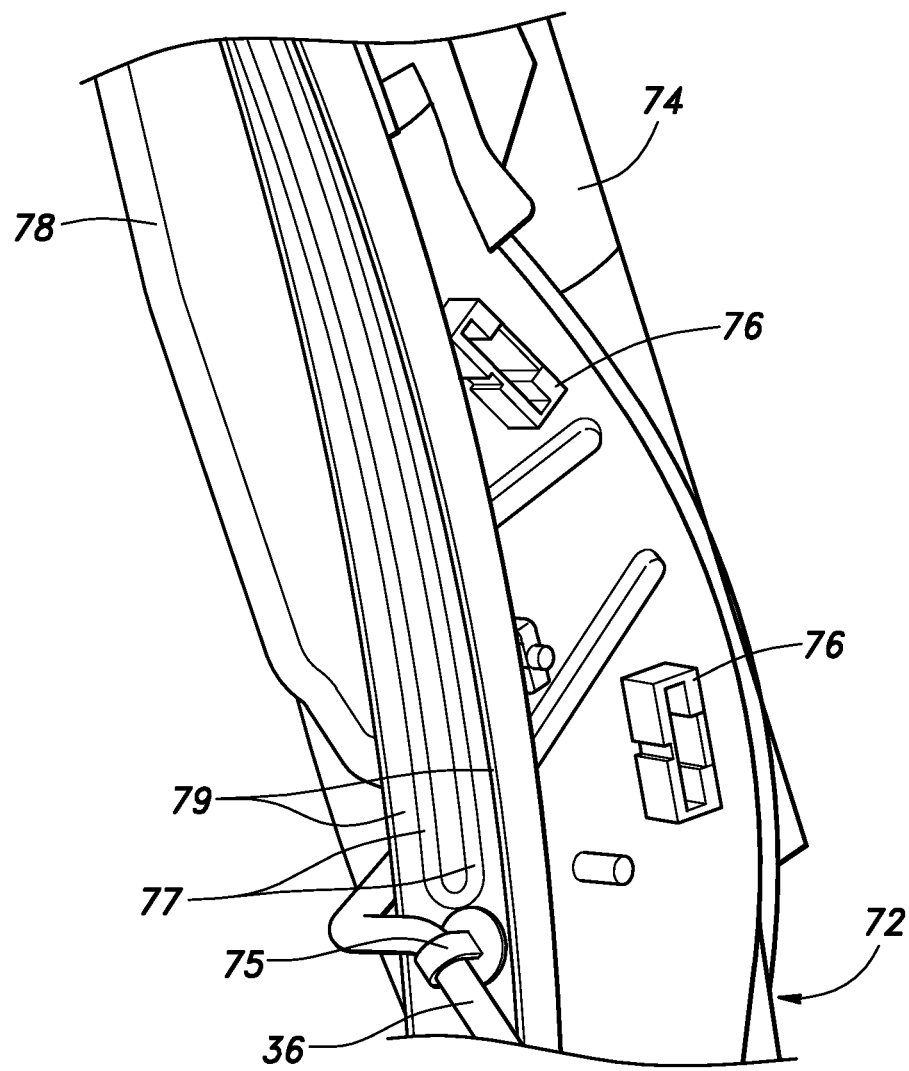
FIG. 10 is a fragmentary perspective view of a side member of a seat back frame as seen from an inner rearward direction.

FIG. 9 is a rear view of the pad 71 of the seat back 3 (see FIG. 1), and FIG. 10 is a perspective view of a side member 72 of the seat back 3 as seen from an inner front side. Those of the skin member securing members 73 for securing the skin member 10 (see FIG. 1) that are positioned in an upper end part of the skin member 10 are fixed in positions located higher than the airbag 74 which is mounted to the side member 72. An other member mounting position 75 for securing another member is preferably spaced from a stay cloth clip mounting position 76 for an airbag 74 in the vertical direction, the lateral direction or in the fore and aft direction. When the other member is to be placed of the side member 72, a pad 71 may be placed between the other member and the skin member securing member 73 to prevent the skin member securing member 73 from being inadvertently dislodged.

When the side member 72 is made of a plate or a sheet member, the other member is preferably mounted to a part of the side member 72 provided with shallow irregular features for increased stiffness. When a bracket is employed to support the other member on the side member 72, the other member mounting position 75 is preferably located adjacent to a bead 77 opposing the airbag 74, and offset from a module hole 78 for the airbag 74, and is preferably offset from the other member mounting position 75 in front view to achieve an increased stiffness. The mounting position of the airbag 74 is preferably located on an extension line of the bead 77 for an increased stiffness. For the purpose of improving the efficiency of the assembling process, the mounting position of the module holder 78 is preferably spaced away from the flange 79 of the side member 72.

The pad 71 includes a main portion 71a located on the front side, and an end portion 71b located on the back side so as to overlap with the upper part and the side parts of the main portion 71a, and covering an upper member (not shown in the drawings) and the side member 72 in cooperation with the main portion 71a. The main portion 71a is provided with a suspension hole 80 for suspending the skin member 10 (see FIG. 1). The end portion 71b is provided with a cutout extending outward in a junction part between the upper part and each lateral part of the end portion 71b. A through hole 82 provided in each side part of the main portion 71a is located on a same plane as the module holder 78 mounted to the side member 72. The through hole 82 is positioned so as to avoid the wire 84 that retain the support member 83.

Second Embodiment

A vehicle seat 101 according to a second embodiment is described in the following with reference to FIGS. 1, 13 and 14.

As shown in FIG. 1, the vehicle seat 101 may be used either as a driver's seat or a passenger seat, and includes a seat cushion 102, a seat back 103, and a headrest 104. The seat cushion 102 is supported by a floor 105 of a passenger compartment of the vehicle via a pair of slide rails 106. The vehicle seat 101 includes a seat cushion frame 107, a cushion pad 109 made of urethane foam or the like, and placed on the seat cushion frame 107, and a skin member 110 covering the cushion pad 109. Each slide rail 106 consists of a lower rail 111 fixed to the floor 105 and an upper rail 112 slidably supported by the lower rail 111, and fixed to the seat cushion frame 107 so that the fore and aft position of the vehicle seat 101 may be adjusted.

Figure 13:
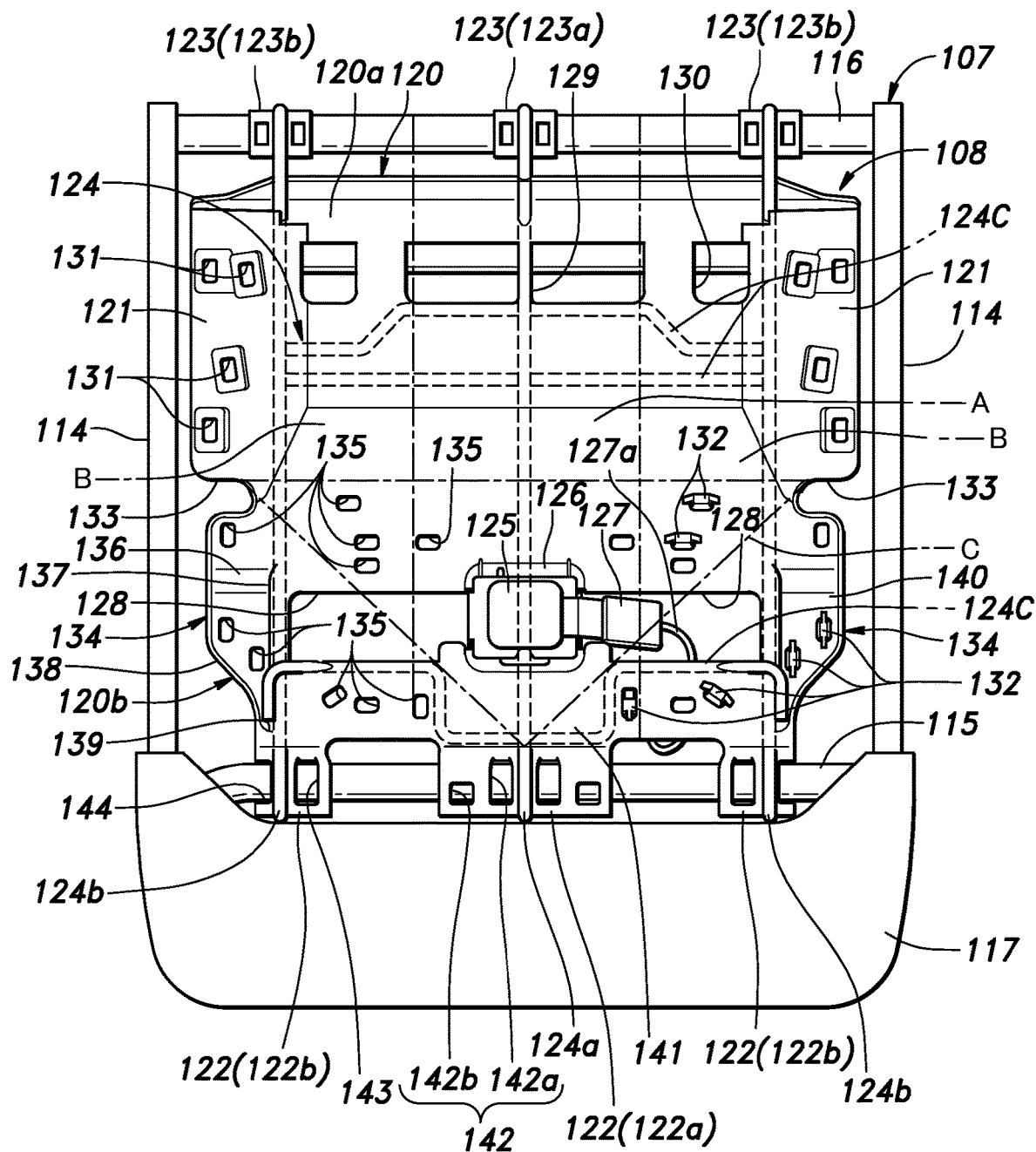
FIG. 13 is a plan view of a seat cushion frame and an internal support member of a vehicle seat according to the second embodiment.

As shown in FIG. 13, the seat cushion frame 107 has a rectangular configuration in plan view, and supports an internal support member 108 positioned within the seat cushion frame 107 and configured to resiliently support the load of the occupant via the skin member 110, and the cushion pad 9. The seat cushion frame 107 and the internal support member 108 are generally mirror images of each other (symmetric in plan view) about a central longitudinal line.

The seat cushion frame 107 includes a pair of side members 114 extending along either side thereof, a front cross member 115 connecting the front ends of the side members 114 to each other, a rear cross member 116 connecting the rear ends of the side members 114 to each other, and a pan frame 117 connected to the front ends of the left and right side members 114, and generally located ahead of the front cross member 115. Each side member 114 consists of a metal channel member elongated in the fore and aft direction, and having a pair of flanges extending laterally from the upper and the lower edges thereof, respectively. The front cross member 115 and the rear cross member 116 each consist of a metal pipe member elongated in the lateral direction. The pan frame 117 consists of a stamp formed sheet metal, and is provided with a contoured surface substantially conforming to the front part of the seating surface.

Figure 14:
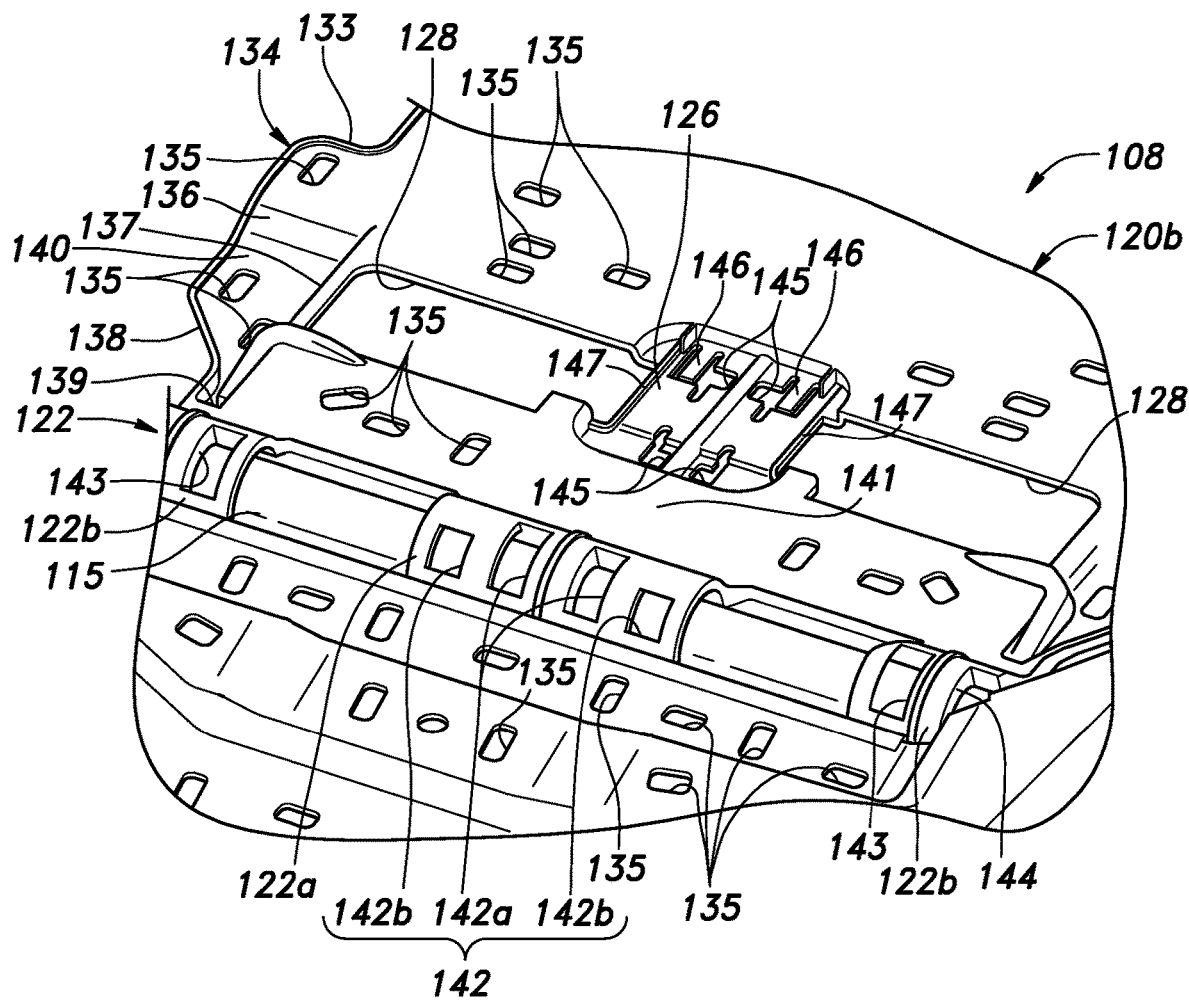
FIG. 14 is a fragmentary perspective view of a front part of the internal support member.

As shown in FIGS. 13 and 14, the internal support member 8 includes a main body 120 in sheet or plate form extending substantially horizontally, a pair of inclined portions 121 extending obliquely upward toward the corresponding lateral outer side edge thereof from either lateral edge of a rear portion 120a of the main body 120, a front mounting portion 122 extending forward from a front edge of the main body 120 and secured to the front cross member 115, and a rear mounting portion 123 extending rearward from a rear edge of the main body 120 with an upward slant, and secured to the rear cross member 116. The main body 120 and the inclined portions are located within the seat cushion frame 107 in plan view.

The part of the main body 120 which is located ahead of a middle point of the rear portion 120a with respect to the longitudinal direction is slightly inclined upward toward the front end of the main body 120. The internal support member 8 is formed by a plastic sheet material, and is provided with metal wires 124 insert molded in the plastic sheet material so that the main body 120 can deform in a resilient manner under the loading of the occupant to resilient support the occupant.

The front mounting portion 122 consists of three front mounting pieces 122 (a central front mounting piece 122a and a pair of outer front mounting pieces 122b) which are located at a laterally central part and either side end part of the front edge of the main body 120, respectively, and engages the front cross member 115 from above. The rear mounting portion 123 also consists of three rear mounting pieces 123 (a central rear mounting piece 123a and a pair of outer rear mounting pieces 123b) which are located at a laterally central part and either side end part of the rear edge of the main body 120, respectively, and engages the rear cross member 116 from above. Each rear mounting piece 123a, 123b is secured to the rear cross member 116 by being wrapped around the front cross member 115 from above.

Since the front mounting portion 122 and the rear mounting portion 123 are each separated into three separate pieces, the attachment of the front mounting portion 122 and the rear mounting portion 123 to the front cross member 115 and the rear cross member 116, respectively, is facilitated. The main body 120 is located lower than the upper end of the front mounting portion 122 and the upper end of the rear mounting portion 123. The wires 124 include a central longitudinal wire 124a extending laterally centrally in the longitudinal direction, a pair of outer longitudinal wire 124b extending on either side of the central longitudinal wire 124a in the longitudinal direction, and a plurality of lateral wires 124c extending substantially in the lateral direction.

The vehicle seat 101 (see FIG. 1) is fitted with a seat belt reminder (SBR) system that issues a warning when the occupant fails to wear the seat belt, and is provided with a pressure sensor 125 for the SBR system. The upper surface of a laterally central part of the front portion 120b of the main body 120 is defined as a sensor mounting portion 126.

The central longitudinal wire 124a passes centrally through the sensor mounting portion 126. The pressure sensor 125 is configured to detect the pressure applied by an occupant on the seat cushion 102 to detect the seating of the occupant on the vehicle seat 101. In the rear portion 120a of the main body 120, the load of the occupant tends to be spread over a wide area due to the presence of the inclined portions 121 so that the pressure of the seat occupant applied to the rear portion 120a of the main body 120 for each given area tends to be reduced. Therefore, the pressure sensor 125 is positioned well ahead of the inclined portions 121 so as to avoid the influence of the inclined portions 121 on the pressure distribution. As a result, detection of a seat occupant which is typically performed by a seating determination means consisting of an ECU or the like that receives the signal from the pressure sensor 125 via a connector 127 and a wire harness 127a can be achieved with a high accuracy. Since the pressure sensor is supported by the central longitudinal wire 124 having a higher stiffness than the plastic material, the pressure applied to the pressure sensor 125 is amplified.

The vehicle seat 101 (see FIG. 11) is fitted with an air ventilation system that improves the seating comfort by drawing or blowing air into or out of the surface of the vehicle seat 101, and a pair of air openings 128 are formed in the main body 120 on either side of the sensor mounting portion 126 to provide air passages for this purpose. Each air opening 128 is rectangular in shape in plan view so that the inner side edges of the air openings 128 define the respective side edges of the sensor mounting portion 126. The plastic material of the sensor mounting portion 126 interposed between the air openings 128 has the central longitudinal wire 124a extending the longitudinal direction buried therein for reinforcement.

The rear portion 120a of the main body 120 is provided with three openings (including a central opening 129 which is laterally centrally located and a pair of outer openings 130 located on either side of the central opening 129) for engaging a plurality of hooks (not shown in the drawings) connected to the skin member 110, and adjusting the bending stiffness of the internal support member 108. The central opening 129, and the outer openings 130 are rectangular in shape in plan view.

The inclined portions 121 are provided with a plurality of tubular portions 131 each protruding downward (on the back side or lower side of the main body 120) to allow clips 132 to be engaged from below. Each clip 132 engages another member at a lower part thereof, and is secured to the tubular portion 131 an upper part thereof by being passed through a through hole formed in a bottom wall of the tubular portion 131 and engaged by the upper surface of the bottom wall of the tubular portion 131. Since the upper end of the clip 132 is located inside the tubular portion 131, and does not protrude upward from the surface of the inclined portions 121, the presence of the clip 132 in the tubular protrusion does not adversely affect the seating comfort of the vehicle seat 101.

The tubular portions 131 are located between the laterally inner edge of each inclined portion 121, and the laterally outer edge thereof, preferably laterally outward of the laterally inner edge of each inclined portion 121 by more than one third of the lateral width of the inclined portion 121, more preferably laterally outward of the laterally inner edge of each inclined portion 121 by more than one half of the lateral width of the inclined portion 121. The bending moment applied to each inclined portion due to the loading of the occupant becomes greater toward the laterally inner side thereof. By placing the tubular portions 131 in relatively laterally outer parts of the inclined portions 121, the clips 132 can be attached to the parts of the inclined portions 121 which are subjected to relatively small bending moments.

A part of each side edge of the internal support member 108 located ahead of the corresponding inclined portion 121 and in a rear end part of the front portion 102b of the inclined portion 121 is provided with a side notch 133. The side notches 133 reduce the weight of the internal support member 108.

Each side edge of a front portion 120b of the main body 120 is provided with a wing portion 134 since the side notch 133 is provided, and the intermediate part of the side edge of a front portion 120b is located generally more outward than the front mounting portion 122. The wing portions 134 are not inclined with respect to the laterally middle part of the front portion 120b, and the wing portions 134 are partly aligned with the pressure sensor 125 in side view. Since the load applied to the front portion 120b is distributed by the wing portions 134, an excessive load is prevented from being applied to the pressure sensor 125. The length of the front portion 120b in the fore and aft direction is shorter than the length of the rear portion 120a in the fore and aft direction, and the outer edge of each wing portion 134 is located laterally inward of the outer edge of the corresponding inclined portion 121. For this reason, the load applied to the front portion 120b is reduced, and the load applied to the rear portion 120a is distributed laterally so that the strength of the internal support member 108 is improved as a whole. In order to prevent an excessive reduction in stiffness in the parts of the main body 120 located between the wing portions 134 and the sensor mounting portion 126, the longitudinal length of the air openings 128 is preferably 1.2 times the longitudinal length of the pressure sensor or less.

A plurality of clip mounting holes 135 are provided in the front portion 120b of the main body 120 for retaining clips 132. The clip mounting holes 135 are generally offset from the sensor mounting portion 126 both in the lateral direction and the longitudinal direction. The clip mounting holes 135 are positioned so as not to overlap with the wires 124 in plan view.

In order to effectively utilize the space between the wires 124, at least some of the clip mounting holes 135 are positioned between the central longitudinal wire 124a and the outer longitudinal wires 124b, and at least some of the clip mounting holes 135 are positioned between the lateral wires 124c. To minimize the influences of the loading of the occupant on the clips 132, preferably, more than half of the clip mounting holes 135 positioned between the central longitudinal wire 124a and the outer longitudinal wires 124b are located on outer sides of the middle points of the two regions defined by the central longitudinal wire 124a and the outer longitudinal wires 124b. The pressure applied to the pressure sensor 125 could be affected by the tip ends of the clips 132 protruding upward from the internal support member 108 via the respective clip mounting holes, but since the clip mounting holes 135 are offset from the sensor mounting portion 126 in the longitudinal direction and the lateral direction, the influences of the protruding tips of the clips can be minimized.

For the purpose of reducing the bending stiffness of the part of the internal support member 8 surrounding the sensor mounting portion 126, some of the clip mounting holes 135 may not be offset from the sensor mounting portion 126 in the fore and aft direction, instead of being offset from the sensor mounting portion 126 in the longitudinal direction. In order to effectively utilize the space between the sensor mounting portion 126 and the rear portion 120a, some of the clip mounting holes 135 may be provided behind the rear edge of the sensor mounting portion 126.

Further, when the front portion 120b of the internal support member 8 is divided into three equal rectangular regions arranged in the lateral direction at the laterally widest parts thereof, a central region A and a pair of side regions B, the number of clip mounting holes 135 included in each side region B is greater than the number of clip mounting holes 135 included in the central region A. By distributing the clip mounting holes 135 in this manner, the stiffness of the central region A located close to the pressure sensor 125 is prevented from being unduly decreased.

In addition, at least some of the clip mounting holes 135 are located within a triangle C defined by connecting a laterally central point of a rear edge of the front mounting piece 122a, and laterally inner ends of the front edges of the inclined portions 121. Since the front mounting piece 122a and the inclined portions 121 are located higher than the main body 120, by positioning the clip mounting holes 135 surrounded by these regions, the loading of the occupant is prevented from being applied to the clips. For the same reason, at least some of the clip mounting holes 135 may be provided ahead of the inclined portions 121 and behind the pressure sensor 125.

In addition, some of the clip mounting holes 135 may be provided at positions laterally aligning with the side notches 133. Thereby, when the pressure sensor 125 receives a load, the front portion 120b of the main body 120 is more readily deformable than the inclined portions 121. In addition, in order to effectively utilize the space available in the lateral direction, some of the clip mounting holes 135 may be aligned in the longitudinal direction. In order to increase the available space for engaging the clips 132, some of the clip mounting holes 135 may be provided in the wing portions 134. The clips 132 and the members to be retained by the clips 132 may be positioned so as not to interfere with a height brake (not shown in the drawings) which restricts the vertical motion of the seat cushion 2 in plan view.

Further, it is preferable that some of the clip mounting holes 135 are provided in the vicinity of the wing portions 134 and the outer front mounting pieces 122b to reduce the stiffness around these portions. It is preferable that the clip mounting holes 135 are disposed in the front portion 120b located forward of the inclined portions 121, and not in the rear portion 120a of the main body 120. Since the load of the occupant is preferentially transmitted to the inclined portions 121, and the rear portion 120a which is flanked by the inclined portions 121, by providing the clip mounting holes 135 in the front portion 120b to which a relatively small part of the load is applied, the reduction in the mechanical strength of the rear portion 120a can be avoided.

At least some of the clips 132 retain a wire harness 127a which is connected to the pressure sensor 125 via a connector 127, and are secured to the clip mount holes 135 from underside of the internal support member 108. In order for the mounting state of the wire harness 127a to be inspected, the wire harness 127a is preferably placed on the underside of the internal support member 108 so as to overlap with either one of the air openings 128. The clips 132 retaining the wire harness 127a are preferably secured to the clip mounting holes 135 located adjacent to the air openings 128. The clip mounting holes are preferably arranged in a laterally symmetric manner about a longitudinal center line extending laterally centrally through the vehicle seat 101 in plan view. By arranging the clip mounting holes 135 in symmetric manner, a member such as a wire harness 127a to be retained by the clips 132 is desired to be provided interchangeably for the driver's seat and an assistant's seat, the common internal support member 108 can be used for both the driver's seat and the assistant's seat.

The part of the front portion 120b of the main body 120 adjoining the air openings 128 on each outer side thereof is formed with a crank portion 136 so that a front part thereof is more recessed downward than a rear part thereof as can be seen in side view. Thereby, the reduction in stiffness caused by the presence of the side notch 133 may be made up for. Since the crank portion 136 causes the front part of the front portion 120b of the main body 120 adjoining the air openings 128 on each outer side thereof to be lower than the rear part thereof, the legs of the occupant are not likely to be interfered by these crank portions 136. Further, a part of the main body 120 adjacent to the laterally outer edge of each rectangular air opening 128 is provided with a curved portion 137 which is curved as seen in front view so as to be connected to the part of the front portion 120b of the main body 120 which is lowered due to the provision of the crank portion 136. The curved portion 137 extends from a part of the main body 120 adjoining the rectangular air opening 128 to a part adjoining the front edge of the main body 120. The curved portion 137 compensates for the reduced stiffness of the part of the main body 120 which is reduced in stiffness owing to the provision of the rectangular air openings 128.

Each wing portion 134 is provided with a flange 138 protruding upward along the outer side edge thereof. The front portion 120b is provided with a front wall portion 139 which extend laterally outward from the front end of the curved portion 137 and extends to the front end of the flange 138. A downwardly recessed part 140 is formed in the front part of each side part of the front portion 120b jointly by the crank portion 136, the curved portion 137, the flange 138, and the front wall portion 139. When the clip mounting holes 135 are in the recessed part 140 of the front portion 120b of the main body 120, and another member is retained by the clip 132 on the underside of the main body 120, the tips of the clip 132 that may protrude from the upper surface of the main body 120 are prevented from impairing the seating comfort of the vehicle seat 101.

Even though the front part of the internal support member 8 is lower as compared to the rear part of the internal support member 8, since the buttocks of the occupant are supported in a large part by the rear part, the influences of the recessed part 140 on the function to support the buttocks of the occupant is small. The crank portion 136, the curved portion 137, the flange 138, and the front wall portion 139 that jointly form the recessed part 140 that does not adversely affect the seating comfort of the vehicle seat 101 increase the stiffness of this part of the main body 120 so that the outer front mounting pieces 122b provided on either side of the main body 120 can be mounted to the front cross member 115 in a highly stable manner.

A connecting portion 141 having the wire 124 buried therein is defined between the sensor mounting portion 126 and the central front mounting piece 122a. The outer contour of the central front mounting piece 122a is substantially rectangular in plan view, and has a lateral width greater than the lateral width of the sensor mounting portion 126. Therefore, the swinging motion of the internal support member 8 about a longitudinal axis is suppressed. Preferably, the left edge of the sensor mounting portion 126 is located to the right of the left edge of the central front mounting piece 122a, and the right edge of the sensor mounting portion 126 is located to the left of the right edge of the central front mounting piece 122a.

The central front mounting piece 122a is provided with rectangular mounting piece openings 142 in the part thereof that engages the front cross member 115. The first mounting piece openings 142 allow the internal support member 8 to be locally flexible while avoiding a decrease in the mounting strength of the central front mounting piece 122a to the front cross member 115. The central first mounting piece openings 142 include two inner openings 142a and two outer openings 142b provided on either side of the inner opening 142a. The lateral lengths of the inner openings 142a and the outer openings 142b are substantially equal to each other, and the fore and aft length of the inner openings 142a is greater than the fore and aft length of the outer openings 142b. Owing to such a difference in size between the inner openings 142a and the outer openings 142b, the laterally middle part of the internal support member 8 can be made flexible in such a manner that an excessive load is prevented from being applied to the pressure sensor 125. Further, since the inner openings 142a have a larger lateral expanse that overlaps with the sensor mounting portion 126 than the outer openings 142b, the flexibility of the sensor mounting portion 126 is increased.

The parts of the outer front mounting pieces 122b that engage the front cross member 115 are each provided with a rectangular second mounting piece opening 143 and a rectangular cutout 144 provided on the laterally outer side edge thereof. The lateral lengths of the second mounting piece opening 143 and the cutout 144 are substantially equal to each other, and the fore and aft lengths of the second mounting piece opening 143 and the cutout 144 are also substantially equal to each other. The second mounting piece opening 143 and the cutout 144 allow the laterally outer part of the internal support member 8 to be relatively flexible without causing the mounting strength of the outer front mounting piece 122b to the front cross member 115 to be decreased.

The sensor mounting portion 126 has mounting portion openings 145 which are covered by the pressure sensor 125 from above, engaging claws 146 engaging the pressure sensor 125, and a pair of locking ribs 147 engaging or abutting against either side edge of the pressure sensor 125. Since the sensor mounting portion 126 is aligned with the central front mounting piece 122a in front view, the pressure sensor 125 may be considered as being mounted in a relatively stable part of the internal support member 8. Furthermore, the mounting stability of the pressure sensor 125 is enhanced by being engaged by the engaging claws 146 and the locking ribs 147. The engaging claws 146 are located laterally inside of the lateral edges of the central front mounting piece 122a, and are aligned with at least a part of the first mounting piece opening 142 in front view. Therefore, the part of the internal support member 8 to which the load applied to the pressure sensor 125 is transmitted can be provided with an increased flexibility with respect to the front cross member 115. Preferably, the mounting portion openings 145 are aligned with a part of the clip mounting holes 135 in front view so that the sensor mounting portion 126 and the adjoining part of the internal support member 8 are made more flexible.

Some of the clip mounting holes 135 may be provided in the pan frame 117 as shown in FIG. 13.

Since the pressure sensor 125 is position on the central longitudinal wire 124a having a higher stiffness than the plastic material, when subjected to the loading of the occupant, the deflection of the sensor mounting portion 126 is relatively small so that the pressure applied to the pressure sensor 125 is amplified. The parts surrounding the wires 124 support the occupant with large forces, but the clips 132 that retain the wire harness to which the pressure sensor 125 is electrically connected are mounted to the clip mount holes 135 located in positions that do not overlap with the wires 124 so that the risk of the clips 132 being dislodged from the internal support member 8 under the loading of the occupant can be minimized.

The present invention has been described in terms of a specific embodiment, but is not limited by such an embodiment, and can be modified in various ways without departing from the spirit of the present invention. For instance, the engaging structure for the edges of the skin member may be other than hooks, such as clips. Some of the ribs of the internal support member may be omitted so that the overall flexibility of the internal support member may be increased. The present invention may also be applied to a seat back of a vehicle seat. In such a case, the upper side and the lower side as used in the claims of this application should be understood as meaning the front side and the back side, respectively. The vehicle seat of the present invention can also be applied to seats of other forms of vehicles such as aircraft and watercraft. Instead of the clip mounting holes and/or the tubular portions, projections configured to engage clips may be provided on the back side of the internal support member.

The invention claimed is:

1. A vehicle seat having a seat cushion, the vehicle seat comprising:
   a seat cushion frame including a pair of side members extending along either side of the seat cushion frame, a front cross member connecting front ends of the side members to each other, and a rear cross member connecting rear ends of the side members to each other;
   an internal support member for supporting an occupant, the internal support member including a main body in plate or sheet form positioned within the seat cushion frame and extending substantially in parallel with the seat cushion frame, a pair of inclined portions extending laterally outward from a part of either lateral side of the main body with an upward slant, a front mounting portion extending from a front edge of the main body and engaged by the front cross member, and a rear mounting portion extending from a rear edge of the main body and engaged by the rear cross member;
   a cushion pad placed on an upper side of the seat cushion frame and the internal support member;
   a skin member covering the cushion pad; and
   a pressure sensor mounted on a part of an upper surface of the internal support member located ahead of the inclined portions;
   wherein the pressure sensor aligns with a part of the front mounting portion in front view,
   the main body of the internal support member is provided with a pair of openings located on either side of the pressure sensor, and a connecting portion connecting the pressure sensor with the part of the front mounting portion aligning with the pressure sensor,
   the pressure sensor and the openings are spaced from the front edge of the main body,
   the internal support member is formed by a sheet of plastic material having a wire insert molded therein, and the connecting portion includes a part of the wire,
   the wire includes a plurality of longitudinal wires extending in a longitudinal direction and a plurality of lateral wires extending in a lateral direction,
   at least one of the longitudinal wires and at least one of the lateral wires pass through the connecting portion, and the at least one of the lateral wires includes a first section passing through the connecting portion and a second section extending along an edge of the openings, the at least one of the lateral wires being bent so that the first section is offset forward relative to the second section.

2. The vehicle seat according to claim 1, wherein the at least one of the longitudinal wires crosses the first section of the at least one of the lateral wires, and includes a part that extends under the pressure sensor and through the front mounting portion.

3. The vehicle seat according to claim 1, wherein in plan view, a center of the pressure sensor and a center of the connecting portion are located within a triangle defined by connecting a laterally central point of a rear edge of the front mounting portion and laterally inner ends of front edges of the inclined portions.

4. The vehicle seat according to claim 1, wherein the pressure sensor is offset from fixation positions of the skin member in plan view.

* * * * *